United States Patent
Tu et al.

(10) Patent No.: US 10,293,702 B2
(45) Date of Patent: May 21, 2019

(54) RECONFIGURABLE HYBRID ENERGY STORAGE SYSTEM FOR ELECTRIFIED VEHICLES

(71) Applicant: McMaster Universtiy, Hamilton (CA)

(72) Inventors: Chia-Hao Tu, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 405 days.

(21) Appl. No.: 14/260,333

(22) Filed: Apr. 24, 2014

(65) Prior Publication Data
US 2014/0368041 A1    Dec. 18, 2014

Related U.S. Application Data

(60) Provisional application No. 61/835,930, filed on Jun. 17, 2013.

(30) Foreign Application Priority Data

Jun. 17, 2013  (CA) ...................................... 2818450

(51) Int. Cl.
*B60L 11/18* (2006.01)
*H02J 1/00* (2006.01)
(Continued)

(52) U.S. Cl.
CPC ......... *B60L 11/1861* (2013.01); *B60L 3/0046* (2013.01); *B60L 3/0092* (2013.01);
(Continued)

(58) Field of Classification Search
CPC .............. B60L 11/1861; B60L 11/1887; B60L 11/1866; B60L 11/007; B60L 11/1855;
(Continued)

(56) References Cited

U.S. PATENT DOCUMENTS 5,581,454 A    12/1996  Collins
5,914,542 A    6/1999   Weimer et al.
(Continued)

OTHER PUBLICATIONS

Eimei Takahara et al., "Series and Parallel Connections Change Over System for Electric Double Layer Capacitors (EDLCs) to Electric Vehicle Energy Saving", Proc. Power Conversion Conference, Osaka, Japan, 2002, vol. 2, pp. 577-581.
(Continued)

*Primary Examiner* — Jared Fureman
*Assistant Examiner* — Emmanuel Dominique
(74) *Attorney, Agent, or Firm* — Bereskin & Parr LLP/S.E.N.C.R.L, S.R.L.; Stephen M. Beney; Reshika Dhir

(57) ABSTRACT

The embodiments described herein relate to a reconfigurable energy storage system. In one embodiment, the reconfigurable energy storage system comprises a first energy storage system, a second energy storage system and a power converter. The power converter determines a first power level, a second power level and a load coupled to the power converter and manipulates the power transfer between the energy storage systems based on the first power level, the second power level and the load. In another embodiment, the reconfigurable energy storage system also comprises a third energy storage system. In this embodiment, the power converter determines a third power level corresponding to the third energy storage system and manipulates the power transfer between the energy storage systems based also on the third power level. The third power level may correspond to a state of charge of the third energy storage element or amount of power generated by the third energy storage system.

20 Claims, 38 Drawing Sheets

(51) Int. Cl.
  B60L 3/00 (2019.01)
  B60L 7/14 (2006.01)
  B60L 11/00 (2006.01)
  B60L 11/12 (2006.01)
  B60L 15/00 (2006.01)
  B60L 11/14 (2006.01)
  H02J 7/00 (2006.01)
  H02J 7/34 (2006.01)
(52) U.S. Cl.
  CPC .............. *B60L 7/14* (2013.01); *B60L 11/005* (2013.01); *B60L 11/007* (2013.01); *B60L 11/123* (2013.01); *B60L 11/14* (2013.01); *B60L 11/1803* (2013.01); *B60L 11/1855* (2013.01); *B60L 11/1866* (2013.01); *B60L 11/1877* (2013.01); *B60L 11/1887* (2013.01); *B60L 15/007* (2013.01); *H02J 7/0024* (2013.01); *B60L 2200/12* (2013.01); *B60L 2210/10* (2013.01); *B60L 2210/30* (2013.01); *B60L 2210/40* (2013.01); *B60L 2220/44* (2013.01); *B60L 2220/46* (2013.01); *B60L 2240/12* (2013.01); *B60L 2240/14* (2013.01); *B60L 2240/427* (2013.01); *B60L 2240/429* (2013.01); *B60L 2240/486* (2013.01); *B60L 2240/527* (2013.01); *B60L 2240/547* (2013.01); *B60L 2240/549* (2013.01); *B60L 2260/28* (2013.01); *H02J 7/0054* (2013.01); *H02J 7/345* (2013.01); *H02J 2001/008* (2013.01); *H02J 2007/005* (2013.01); *Y02T 10/6217* (2013.01); *Y02T 10/645* (2013.01); *Y02T 10/7022* (2013.01); *Y02T 10/7044* (2013.01); *Y02T 10/7055* (2013.01); *Y02T 10/7061* (2013.01); *Y02T 10/7077* (2013.01); *Y02T 10/7216* (2013.01); *Y02T 10/7241* (2013.01); *Y02T 10/92* (2013.01); *Y02T 90/34* (2013.01); *Y10T 307/549* (2015.04)
(58) Field of Classification Search
  CPC ........ B60L 11/14; B60L 11/1803; B60L 7/14; B60L 11/005; B60L 11/1877; B60L 11/123; B60L 3/0092; B60L 3/0046; B60L 15/007; H02J 1/00; Y02T 10/6217; Y02T 90/34; Y02T 10/70
  See application file for complete search history.

(56) References Cited

U.S. PATENT DOCUMENTS

| | | | |
|---|---|---|---|
| 5,973,944 | A | 10/1999 | Nork |
| 6,169,673 | B1 | 1/2001 | McIntyre et al. |
| 6,198,645 | B1 | 3/2001 | Kotowski et al. |
| 6,218,818 | B1 | 4/2001 | Kim |
| 6,304,007 | B1 | 10/2001 | Yu |
| 6,359,424 | B2 | 3/2002 | Iida et al. |
| 6,370,046 | B1 | 4/2002 | Nebrigic et al. |
| 6,531,792 | B2 | 3/2003 | Oshio |
| 6,563,235 | B1 | 5/2003 | McIntyre et al. |
| 6,650,091 | B1 | 11/2003 | Shiue et al. |
| 6,657,875 | B1 | 12/2003 | Zeng et al. |
| 7,075,194 | B2 | 7/2006 | Weidenheimer et al. |
| 7,190,210 | B2 | 3/2007 | Azrai et al. |
| 7,239,194 | B2 | 7/2007 | Azrai et al. |
| 7,468,898 | B2 | 12/2008 | Ogata et al. |
| 7,489,048 | B2 * | 2/2009 | King ................ B60L 11/1864 307/10.1 |
| 7,626,354 | B2 | 12/2009 | Hanyu et al. |
| 7,663,427 | B2 | 2/2010 | Fujiwara |
| 7,696,729 | B2 | 4/2010 | Shiue et al. |
| 7,750,606 | B2 | 7/2010 | Rusan et al. |
| 7,923,865 | B2 | 4/2011 | Melse |
| 8,084,887 | B2 | 12/2011 | Weidenheimer et al. |
| 8,966,295 | B2 * | 2/2015 | Oglesby ................ G06F 1/263 307/64 |
| 2005/0023054 | A1 * | 2/2005 | Weidenheimer .......... F41B 6/00 180/65.25 |
| 2006/0133007 | A1 | 6/2006 | Shiue et al. |
| 2008/0218104 | A1 * | 9/2008 | Lukic .................... B60L 11/005 318/139 |
| 2009/0079384 | A1 * | 3/2009 | Harris ...................... B60L 7/14 320/102 |
| 2009/0085553 | A1 * | 4/2009 | Kumar ................ H01M 10/425 323/351 |
| 2009/0289497 | A1 * | 11/2009 | Ichikawa ............... B60K 6/445 307/9.1 |
| 2010/0133025 | A1 * | 6/2010 | Flett ........................ B60K 6/46 180/65.22 |
| 2010/0305792 | A1 | 12/2010 | Wilk et al. |
| 2010/0315048 | A1 | 12/2010 | De Sousa et al. |
| 2011/0084648 | A1 | 4/2011 | Cao et al. |
| 2012/0025614 | A1 * | 2/2012 | Taimela .................. H02J 9/062 307/65 |
| 2013/0038127 | A1 * | 2/2013 | King .................... B60L 11/1857 307/64 |
| 2014/0084817 | A1 * | 3/2014 | Bhavaraju ............. B60L 11/005 318/139 |
| 2014/0117770 | A1 * | 5/2014 | Emadi ..................... H02M 7/49 307/82 |

OTHER PUBLICATIONS

Arvind Govindaraj et al., "Performance Characterization and Optimization of Various Circuit Topologies to Combine Batteries and Ultra-Capacitors", Proc. 36th IEEE Industrial Electronics Society Conference, pp. 1850-1857, Nov. 2010.

Jian Cao et al., "A New Battery/UltraCapacitor Hybrid Energy Storage System for Electric, Hybrid, and Plug-In Hybrid Electric Vehicles", IEEE Transactions on Power Electronics, vol. 27, No. 1, pp. 122-132, Jan. 2012.

Yee-Pien Yang et al., "Electronic Gears for Electric Vehicles with Wheel Motor", Proc. 31st IEEE Industrial Electronics Society Conference, Nov. 2005.

* cited by examiner

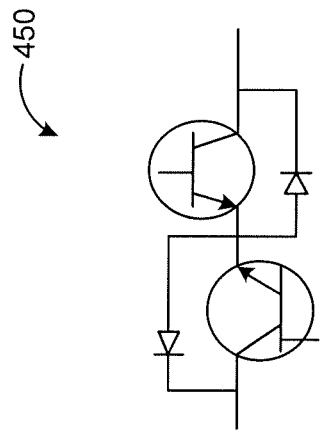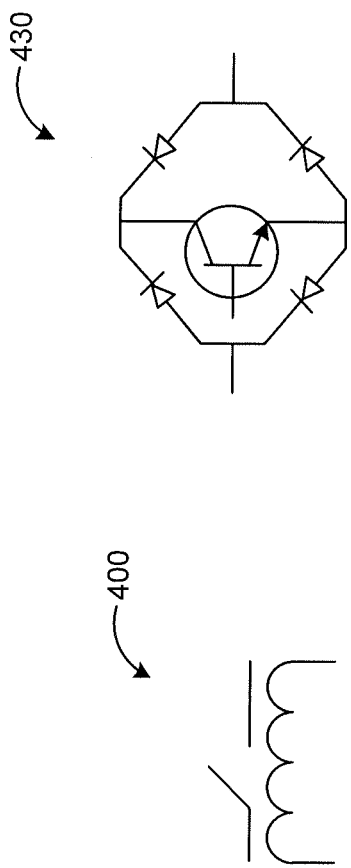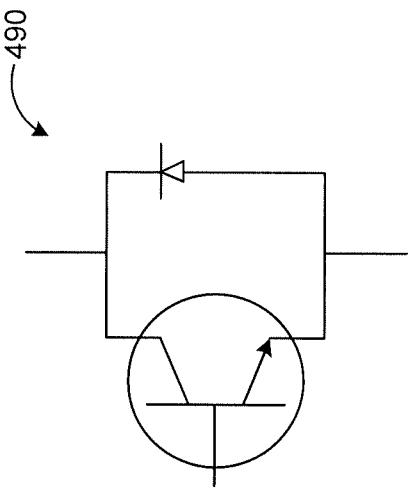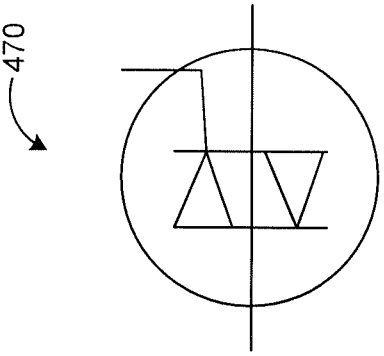
FIG. 4A
FIG. 4B
FIG. 4C
FIG. 4D
FIG. 4E

RECONFIGURABLE HYBRID ENERGY STORAGE SYSTEM FOR ELECTRIFIED VEHICLES

CROSS-REFERENCE TO RELATED APPLICATION

This application claims the benefit of U.S. Provisional Patent Application No. 61/835,930 filed Jun. 17, 2013, the contents of which are incorporated herein by reference.

FIELD

The described embodiments relate to reconfigurable energy storage systems. More particularly, the embodiments relate to reconfigurable energy storage systems for electric, hybrid and plug-in hybrid vehicle applications.

INTRODUCTION

In electric (EV), hybrid electric (HEV) and plug-in hybrid electric (PHEV) vehicle applications, the energy storage system has a direct impact on the vehicle performance during various stages of vehicle operation, such as, for example, during regenerative braking, acceleration, cruising etc.

Typically, energy storage systems used in EV, HEV and PHEV applications do not optimize at the same time energy, power and life cycle of the various components within the energy storage system. Furthermore, such energy storage systems tend to be expensive, heavy in weight and/or bulky in size. This can result in inefficient vehicle performance and unsatisfactory customer experience.

SUMMARY

In a first aspect, some embodiments of the invention provide a method of reconfiguring a reconfigurable energy storage system. The reconfigurable energy storage system may comprise a first energy storage system storing electrical energy, a second energy storage system storing electrical energy and a power converter coupled to the first energy storage system and the second energy storage system. The method may comprise determining a first power level corresponding to a state of charge of the first energy storage system; determining a second power level corresponding to a state of charge of the second energy storage system; determining a load coupled to the power converter; and manipulating the power transfer between the first energy storage system and the second energy storage system based on the first power level, the second power level and the load.

In some cases, when the second power level is lower than a second threshold, the first power level is equal to or higher than a first threshold and the load is zero, the first energy storage system is manipulated to charge the second energy storage system.

In some other cases, where the first power level is lower than a first threshold, the second power level is equal to or higher than a second threshold and the load is zero, the second energy storage system is manipulated to charge the first energy storage system.

In cases where the load requires a high current, the first energy storage system is configured in parallel with the second energy storage system.

In cases where the load requires a voltage higher than each of the first energy storage system and the second energy storage system, the first energy storage system is configured in series with the second energy storage system.

In cases where the load supplies a voltage higher than each of the first energy storage system and the second energy storage system, the first energy storage system is configured in series with the second energy storage system.

In cases where the load supplies a voltage within an allowable voltage range of the each of the first energy storage system and the second energy storage system, the first energy storage system is configured in parallel with the second energy storage system.

In some cases, the first energy storage system is any system that provides an energy density higher than the power density.

In some cases, the second energy storage system is any system that provides a power density higher than the energy density.

In some cases, the first energy storage system is a lithium ion battery.

In some cases, the second energy storage system is an ultracapacitor.

The reconfigurable energy storage system may further comprise a third energy storage system for providing electrical energy and/or vehicle propulsion and the method further comprises determining a third power level corresponding to the third energy storage system; and manipulating the power transfer between the first energy storage system, the second energy storage system and the third energy storage system based further on the third power level.

In some cases, the third energy storage system generates electrical energy. In such cases, the third power level corresponds to an amount of electrical energy generated by the generation module. In such cases, the third energy storage system is a generation unit. For example, the third energy storage system may be an internal combustion engine (ICE)-generation unit. The third energy storage system may alternatively be a compressed natural gas (CNG)-generation unit.

In some other cases, the third power level corresponds to a state of charge of the third energy storage system. In such cases, the third energy storage system may be any storage system with an energy density higher than the power density.

In some cases, at least one of the first energy storage system and the second energy storage system is charged by the third energy storage system.

In various cases, the power converter includes at least one bidirectional switch. In such cases, the at least one bidirectional switch may connect or disconnect at least one of the first energy storage system and the second energy storage system.

In cases where the reconfigurable energy storage system comprises a first energy storage system, a second energy storage system and a third energy storage system, the at least one bidirectional switch may also connect or disconnect the third energy storage system.

In another aspect, some embodiments of the invention provide a reconfigurable energy storage system. The system may comprise a first energy storage system for storing electrical energy; a second energy storage system for storing electrical energy; a power converter coupled to the first energy storage system and the second energy storage system, the power converter for determining a first power level corresponding to a state of charge of the first energy storage system; the power converter for determining a second power level corresponding to a state of charge of the second energy storage system; the power converter for determining a load coupled to the power converter, and the power converter for manipulating power transfer between the first energy storage system and the second energy storage system based on the first power level, the second power level and the load.

In some cases, the reconfigurable energy storage system may further comprise a third energy storage system for providing electrical energy. In such cases, the power converter may be configured to determine a third power level corresponding to the third energy storage system, and manipulate the power transfer between the first energy storage system, the second energy storage system and the third energy storage system based further on the third power level.

In some cases, the power converter is configured to determine a state of charge of the third energy storage system as the third power level. The third energy storage system may provide an energy density higher than the power density.

In some other cases, the third energy storage system generates electrical energy and in such cases, the power converter is configured to determine an amount of electrical energy generated by the generation module as the third power level.

BRIEF DESCRIPTION OF THE DRAWINGS

Several example embodiments of the present invention will now be described in detail with reference to the drawings, in which:

FIG. 4A illustrates a bidirectional switch configuration according to a first example embodiment;

FIG. 4B illustrates a bidirectional switch configuration according to a second example embodiment;

FIG. 4C illustrates a bidirectional switch configuration according to a third example embodiment;

FIG. 4D illustrates a bidirectional switch configuration according to a fourth example embodiment;

FIG. 4E illustrates a bidirectional switch configuration according to a fifth example embodiment;

In the Figures, corresponding elements are, in general, identified by similar reference numerals. The Figures are not drawn to scale and various features and waveforms have been exaggerated and compressed to indicate various features of the invention.

DESCRIPTION OF EXEMPLARY EMBODIMENTS

Figure 1:
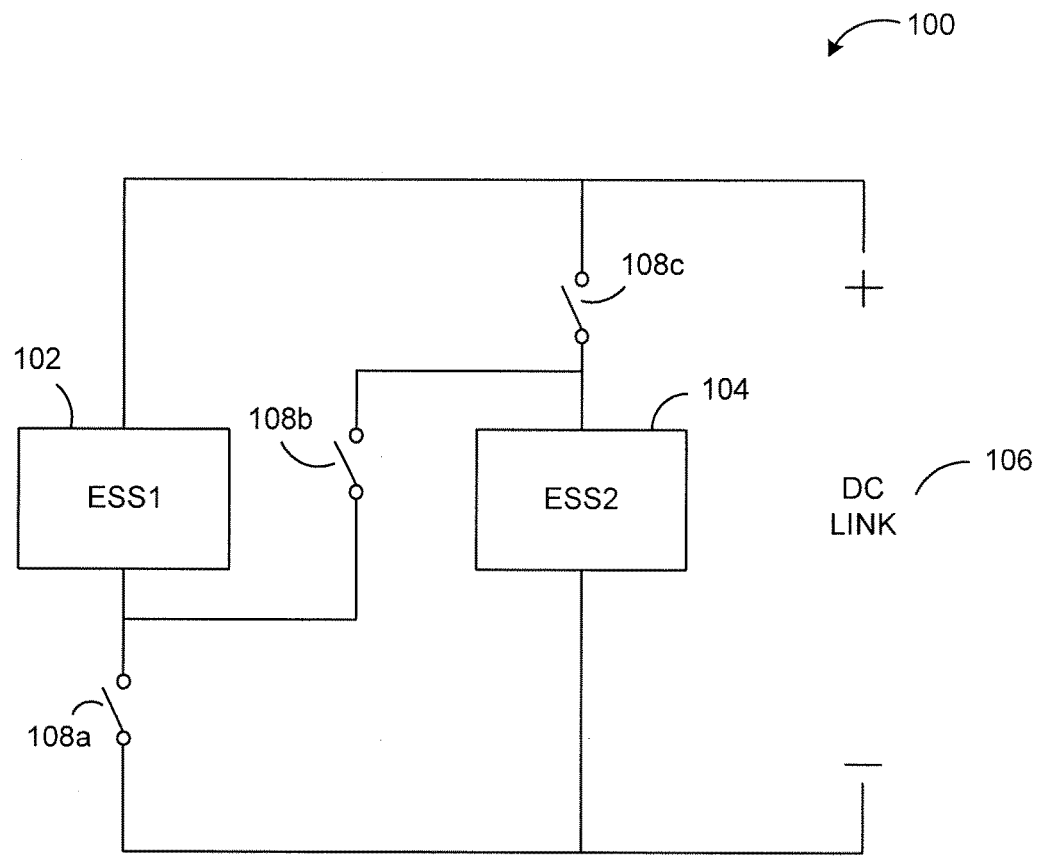
FIG. 1 illustrates a reconfigurable energy storage system according to an example embodiment.

Reference is first made to FIG. 1, which illustrates a reconfigurable energy storage system 100 according to an example embodiment. Reconfigurable energy storage system 100 includes a first energy storage system 102, a second energy storage system 104, a DC link 106 and a plurality of switches 108a, 108b and 108c.

Switch 108a is coupled between the first energy storage system 102 and the negative terminal of the DC link 106. Switch 108c is coupled between the positive terminal of the DC link 106 and the second energy storage system 104. Switch 108b is connected between the negative terminal of the first energy storage system 102 and the positive terminal of the second energy storage system 104.

An energy storage system may be any device or a combination of devices that provides electrical energy. An energy storage system may provide electrical energy by either generating electrical energy and/or storing electrical energy. Examples of an energy storage system, such as, for example, the first energy storage system 102 and the second energy storage system 104, may include a battery, a capacitor, a supercapacitor, an ultracapacitor (UC), a fuel cell, an internal combustion engine-generation set (ICE-GEN), or a combination of these.

First energy storage system 102 may be any device or a combination of devices that stores electrical energy. Similarly, second energy storage system 104 may be any device or combination of device that stores electrical energy. In some cases, the first energy storage system 102 is a battery, such as, for example, a lithium ion battery. Typically, a lithium ion battery has a high energy density and a low power density. The first energy storage system 102 may be any other kind of a battery with a high energy density and a low power density.

In some cases, the second energy storage system 104 is an ultracapacitor. Ultracapacitors are capacitors with high capacitance, low equivalent series resistance (ESR) and low rated voltage values. Typically, ultracapacitors have a high power density and a low energy density.

Power density generally represents the amount of power the system can supply. Energy density generally represents how long the system can supply the power. By connecting the lithium ion battery in parallel with the ultracapacitor, the power of ultracapacitor may be fully utilized. By connecting the lithium ion battery in series with the ultracapcitor, the energy of the ultracapacitor may be fully utilized. The series connection of the ultracapcitor with the battery allows the ultracapacitor to be fully discharged.

Reconfigurable energy storage system 100 can be arranged in a variety of configurations, such as, for example, a series configuration, a parallel configuration and series-parallel configuration. The reconfigurable energy storage system 100 may be reconfigured to satisfy the load requirements at the DC link 106 and/or the operating conditions of the first energy storage system 102, the second energy storage system 104 or both.

In one configuration, switch 108a closes to provide a closed circuit connecting the first energy storage system 102 to the DC link 106. In this configuration, the DC link 106 is connected to the first energy storage system 102. This configuration may be desired if the load requirement at the DC link 106 can be satisfied by the first energy storage system 102. This configuration may alternatively, or in addition, be desired if the second energy storage system 104 has a low state of charge or is in a fault state and cannot contribute towards providing power to the load.

In another configuration, switch 108c closes to provide a closed circuit connecting the second energy storage system 104 to the DC link 106. In this configuration, the DC link 106 is connected to the second energy storage system 104. This configuration may be desired if the load requirement at the DC link 106 can be satisfied by the second energy storage system 104. This configuration may alternatively, or in addition, be desired if the first energy storage system 102 has a low state of charge or is in a fault state and cannot contribute towards providing power to the load.

In a third configuration, switch 108b closes to provide a closed circuit connecting the first energy storage system 102, the second energy storage system 104 and the DC link 106. In this configuration, the DC link 106 is connected to both the first energy storage system 102 and the second energy storage system 104 where the first energy storage system 102 and the second energy storage system 104 are connected in series. This configuration may be desired if the voltage requirement of the load at the DC link 106 exceeds the voltage provided by either the first energy storage system 102 or the second energy storage system 104 but can be met by the combined voltage of the first energy storage system 102 and the second energy storage system 104. In an application of an electric or a hybrid vehicle, this configuration may be desired during high speed acceleration of the vehicle and/or during the time the vehicle maintains a constant high speed.

In a fourth configuration, switches 108a and 108c close to provide a closed connection between the first energy storage system 102 and the DC link 106 and the second energy storage system 104 and the DC link 106. In this configuration, the first energy storage system 102 and the second energy storage system 104 are connected in parallel. This configuration may be desired if the load at the DC link 106 has a high current requirement. In an application of an electric or a hybrid vehicle, this configuration may be desired during acceleration of the vehicle from a standstill state.

Reconfigurable energy storage system 100 may not allow for either voltage regulation, or power regulation or both over the DC link 106. Large DC link voltage fluctuation may occur when the reconfigurable energy storage system 100 changes configurations between series, parallel and series-parallel.

Figure 2:
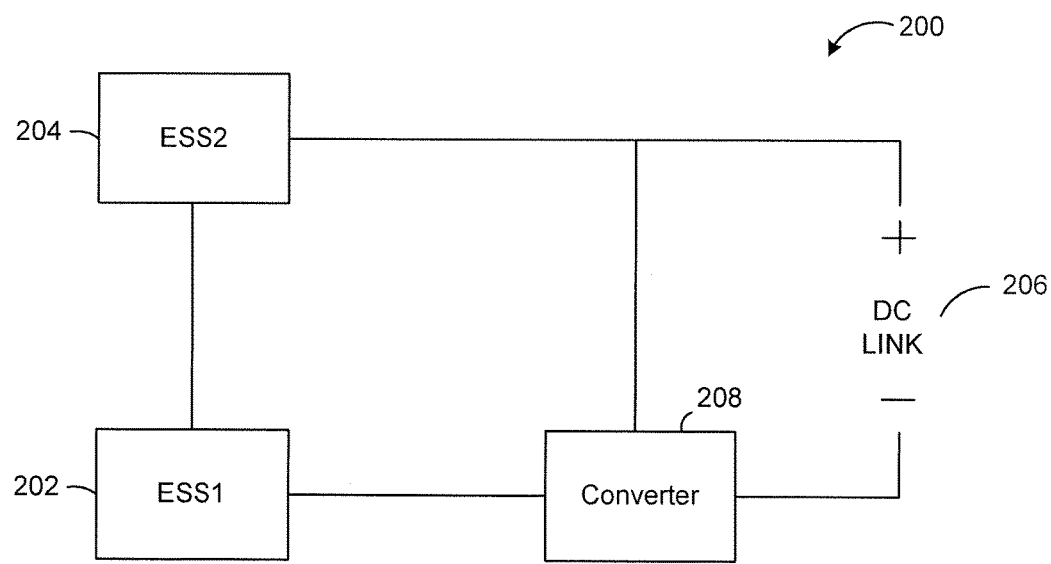
FIG. 2 illustrates a reconfigurable energy storage system according to another example embodiment.

Reference is next made to FIG. 2, illustrating a reconfigurable energy storage system 200 according to another example embodiment. Reconfigurable energy storage system 200 includes a first energy storage system 202, a second energy storage system 204, a DC link 206 and a power converter 208. Reconfigurable energy storage system 200 may be used in an electric vehicle (EV) application. Reconfigurable energy storage system 200 may also be used in other applications, such as, smart grids, micro grids, uninterruptable power supply systems etc.

Power converter 208 may allow a transfer of power, energy or both from one energy storage system to another. Power converter 208 may provide a layer of control over the DC link 206 and the various energy storage systems, such as the first energy storage system 202 and the second energy storage system 204. Voltage fluctuations on the DC link 206 may be compensated allowing a smoother transition from one configuration to another.

Power converter 208 may also monitor the load conditions at the DC link 206. For example, power converter 208 may determine if the load requires a high current, or high voltage, or if the load is disconnected etc. Power converter 208 may additionally also monitor the operating conditions of the energy storage systems within the reconfigurable energy storage system 200. For example, power converter 208 may monitor the state of charge of the first energy storage system 202 and/or the second energy storage system 204.

Figure 3:
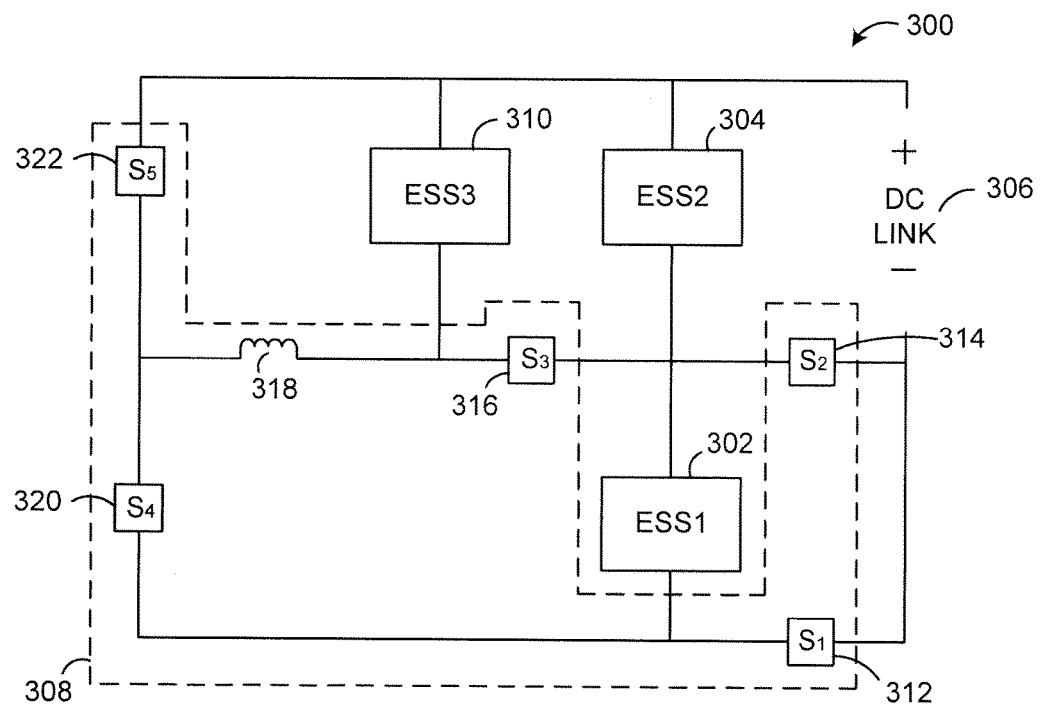
FIG. 3 illustrates a reconfigurable energy storage system according to another example embodiment.

Reference is next made to FIG. 3, illustrating a reconfigurable energy storage system 300 according to an example embodiment. Reconfigurable energy storage system 300 includes a first energy storage system 302, a second energy storage system 304, a DC link 306, a power converter 308 and a third energy storage system 310.

Reconfigurable energy storage system 300 may be used in various applications, such as, for example, hybrid-electric vehicles (HEV), plug-in hybrid electric vehicles (PEV), smart grids, micro grids and uninterruptable power systems etc.

First energy storage system 302 is similar to first energy storage system 102, and second energy storage system 304 is similar to second energy storage system 104. Both the first energy storage system 302 and the second energy storage system 304 are configured to store electrical energy. First energy storage system 302 is a device or a combination of device having a high energy density and a low power density. Second energy storage system 304 is a device or a combination of device having a high power density and a low energy density.

Third energy storage system 310 may be any device or a combination of devices that provides electrical energy. In some cases, third energy storage system 310 generates electrical energy. In such cases, the third energy storage system is a generation unit. For example, the third energy storage system may be an internal combustion engine (ICE)-generation unit. The third energy storage system may alternatively be a compressed natural gas (CNG)-generation unit. In some other cases, the third energy storage system 310 may be any device or a combination of devices with a high energy density and a low power density, or vice versa.

Power converter 308 comprises a plurality of switches and an inductor 318. In some cases, the first energy storage system 302, second energy storage system 304 and the third energy storage system 310 do not switch in and out of the reconfigurable energy storage system 300 at a high frequency. In such cases, relays may be used in place of the switches. In some other cases, a combination of relays and switches may be used within the power converter 308.

As illustrated, power converter 308 comprises a first switch 312, a second switch 314, a third switch 316, a fourth switch 320 and a fifth switch 322. Switches 312, 314, 316, 320 and 322 are bidirectional switches allowing the first energy storage system 302, the second energy storage system 304 and the third energy storage system 310 to be switched in and out of the bidirectional energy storage system 300. Power converter 308 is accordingly a bidirectional converter allowing bidirectional current flow.

First switch 312 and second switch 314 allow switching of the ground of the DC link 306 to either the ground of the first energy storage system 302 or the ground of the second energy storage system 304. Third switch 316 allow connecting and disconnecting of the power converter 308 and the third energy storage system 310 from the rest of the components of the reconfigurable energy storage system 300.

Power converter 308 is configured to determine operating conditions of the various components of the reconfigurable energy storage system 300. Operating conditions of the components may include a power level of the component. In some cases, the power level may represent a state of charge of the component. In some other cases, the power level may represent an amount of electrical energy generated by a component. As illustrated, power converter 308 determines a first power level corresponding to a state of charge of the first energy storage system 302 and a second power level corresponding to a state of charge of the second energy storage system 304.

Power converter 308 is also configured to determine a load coupled to the power converter 308. As illustrated, power converter 308 is configured to determine the load at the DC link 306. Power converter 308 may determine if the load at the DC link 306 is connected or not. Power converter 308 may also determine if the load at the DC link 306 requires a high current or a high voltage.

Power converter 308 is configured to manipulate the power transfer between the various components of the reconfigurable energy storage system 300 based on the various operating conditions of the components and the load requirements. As illustrated, power converter 308 is configured to manipulate the power transfer between the first energy storage system 302, the second energy storage system 304 and the third energy storage system 310 based the first power level, the second power level and the load. The manipulation of the power transfer between the various components of the reconfigurable energy storage system based on the load and the operating conditions of the components are discussed in further detail below.

Reference is made to FIGS. 4A-4E, illustrating bidirectional switch configurations according to various example embodiments. Switches 312, 314, 316, 320 and 322 of FIG. 3 can be any bidirectional switches with any configurations illustrated herein. FIG. 4A illustrates a bidirectional switch 400 according to a first example embodiment. FIG. 4B illustrates a bidirectional switch 430 according to a second example embodiment. FIG. 4C illustrates a bidirectional switch 450 according to a third example embodiment. FIG. 4D illustrates a bidirectional switch 470 according to a fourth example embodiment. FIG. 4E illustrates a bidirectional switch 490 according to a fifth example embodiment.

In some cases, as illustrated, bidirectional switches 430, 450 and 490 include insulated-gate bipolar transistors or IGBTs. In some other cases, bidirectional switches 430, 450 and 490 include metal-oxide-semiconductor field-effect transistors or MOSFETs.

In one case, as illustrated, bidirectional switch 450 of FIG. 4C includes two IGBTs connected at respective emitters to provide a common emitter connection. In other cases, bidirectional switch 450 may include two IGBTs connected at respective collectors to provide a common collector connection. In some further cases, bidirectional switch 450 may include MOSFETs connected at respective drains or sources to provide a common drain or a common source connection.

Bidirectional switch 400 may be configured in a variety of different ways. For example, in one case, as illustrated, bidirectional switch 400 includes a single pole, single throw (SPST) relay or contactor. In some other cases, bidirectional switch 400 includes a single pole, double throw (SPDT) relay or contactor.

Solid-state bidirectional switches are typically used in energy storage systems that are required to reconfigure themselves very fast. Solid-state bidirectional switches include solid-state components, such as IGBTs, MOSFETs etc. Examples of solid-state bidirectional switches include switches 430, 450 and 490. Solid-state bidirectional switches have high switching speeds, such as, for example, switching speeds in the range of microseconds or less. Other bidirectional switches are typically used as relays or contactors. Such bidirectional switches have relatively lower switching speeds, such as, for example, switching speeds in the range of milliseconds or more.

As illustrated, bidirectional switches 400, 430, 450, 470 and 490 allow current to flow bidirectionally. Bidirectional switches 400, 430, 450, 470 and 490 may be used as circuit breakers, safety relays or safety contactors. Bidirectional switches 400, 430, 450, 470 and 490 may also be used as power switches that redirect the power flow, switch energy storage systems in and out at a moderate frequency, and reconfigure the energy storage systems.

Typically, in electric (EV), hybrid-electric (HEV) and plug-in hybrid electric vehicle (PHEV) applications, the power and energy density and rating of energy storage systems have a direct impact on the vehicle performance. For example, when a vehicle, such as, EV, HEV and/or PHEV, is in a regenerative braking mode, the energy storage system may have to withstand surge charges. When a vehicle, such as, EV, HEV and/or PHEV, is in an acceleration mode, the energy storage system may have to supply a high amount of power. When a vehicle, such as, EV, HEV and/or PHEV, is in a cruising mode, the energy storage system may have to be able to maintain a charge long enough for a reasonable length of time.

Use of a single type of energy storage system may not provide high energy, high power and high life cycle. Combining various energy storage systems in a reconfigurable configuration, however, may provide an energy storage system that optimizes efficiency, life cycle and simplicity of the energy storage system.

Combining energy storage systems with high energy density, such as, for example, an internal combustion engine-generator set (ICE-GEN), battery and a fuel cell (FC), with energy storage systems with high power density, such as, for example, an ultracapcitor (UC), and selectively coupling multiple energy storage systems in series, parallel or series-parallel configurations, the overall energy storage system may be optimized for efficiency, life cycle, fault tolerance and simplicity. The multiple energy storage systems may be selectively coupled in response to factors such as load requirements and operating conditions of the various energy storage systems.

Figure 5A:
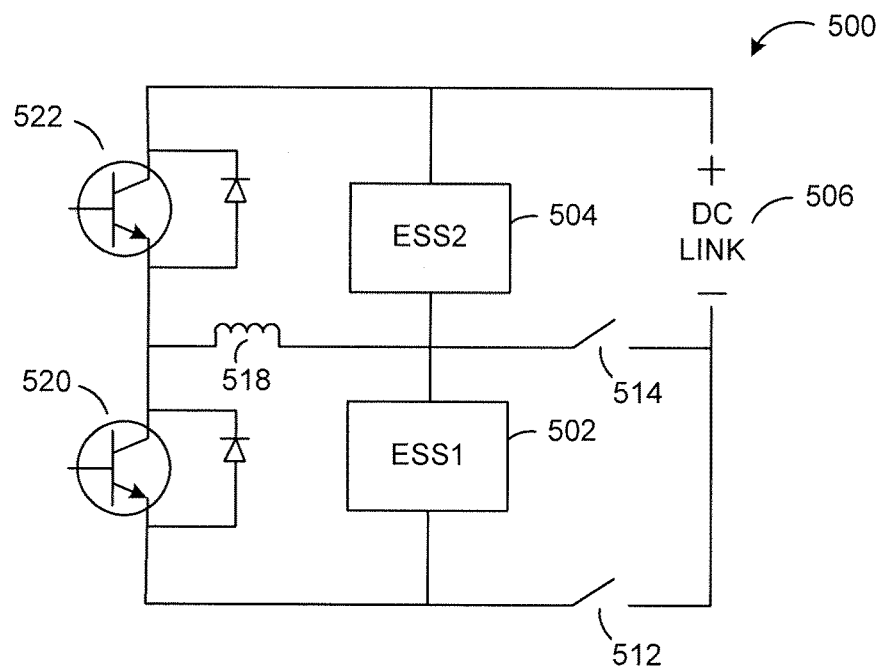
FIG. 5A illustrates a reconfigurable energy storage system according to an example embodiment.

Reference is next made to FIG. 5A, illustrating a reconfigurable energy storage system 500 according to an example embodiment. Reconfigurable energy storage system 500 may be used in electric vehicles (EV) applications.

Reconfigurable energy storage system 500 comprises a first energy storage system 502, a second energy storage system 504, a DC link 506, a first switch 512, a second switch 514, a third switch 520, a fourth switch 522 and an inductor 518.

First switch 512, second switch 514, third switch 520 and fourth switch 522 are bidirectional switches. In some cases, switches 512, 514, 520, 522 may be any of the switches illustrated in FIGS. 4A-4E. In various cases, switches 520 and 522 require high speed operations and may be any one of the solid-state bidirectional switches, such as, for example, bidirectional switch 490 of FIG. 4E.

First switch 512 allows switching of the negative terminal of the DC link 506 to the negative terminal of the first energy storage system 502. Second switch 514 allows switching of the negative terminal of the DC link 506 to the negative terminal of the second energy storage system 504. In some cases, the negative terminals of some or all of the DC link 506, the first energy storage system 502 and the second energy storage system 504 may be connected to ground.

Figure 5B:
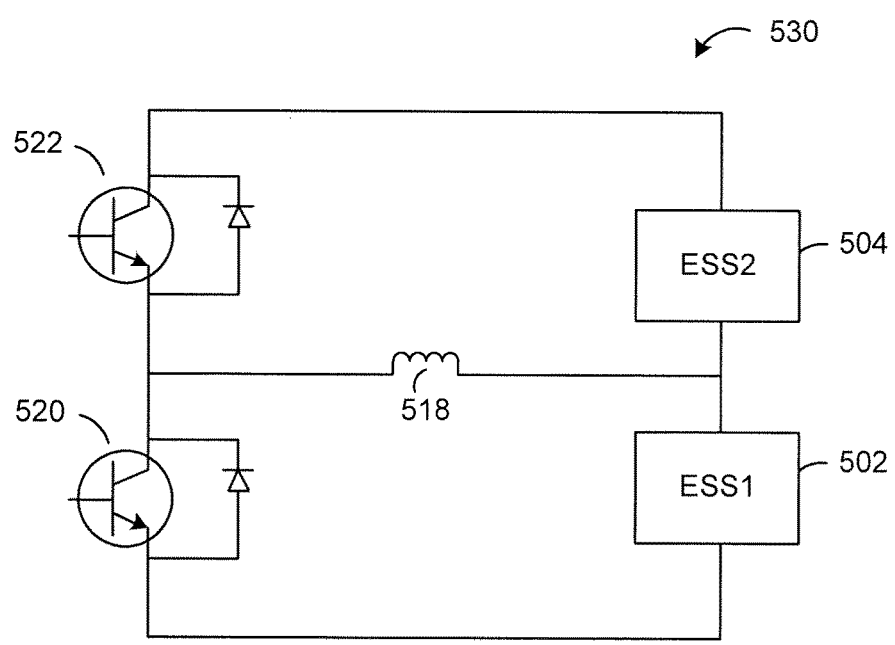
FIG. 5B illustrates the reconfigurable energy storage system of FIG. 5A with the first switch and the second switch open.

Reference is made to FIG. 5B illustrating a reconfigurable energy storage system 530 according to a first configuration. In this configuration, both the first switch 512 and the second switch 514 are open. Accordingly, a closed circuit path is formed including the second energy storage system 504, the first energy storage system 502, the third switch 520 and the fourth switch 522.

In cases, where the first energy storage system 502 is an energy storage system with a high energy density, such as, a battery, and the second energy storage system 504 is an energy storage system with a high power density, such as, for example, an ultracapacitor, this configuration allows the energy transfer between the first energy storage system 502 and the second energy storage system 504.

In some cases, where the second power level or the state of charge of the second energy storage system 504, is less than a second threshold level but the first power level, or the state of charge of the first energy storage system 502, is equal to or higher than a first threshold level, the energy transfer may occur from the first energy storage system 502 to the second energy storage system 504. In cases, where the first energy storage system 502 is a lithium battery and the second energy storage system 504 is an ultracapacitor, the lithium battery charges the ultracapacitor if the state of charge of the ultracapacitor is lower than a second threshold level.

In some other cases, where the first power level, or the state of charge of the first energy storage system 502, is less than a first threshold level but the second power level, or the state of charge of the second energy storage system 504, is equal to or higher than the second threshold level, the energy transfer may occur from the second energy storage system 504 to the first energy storage system 502. In cases, where the first energy storage system 502 is a lithium battery and the second energy storage system 504 is an ultracapacitor, the lithium battery harvests energy captured in the ultracapacitor if the state of charge of the lithium battery is lower than the first threshold level.

The first threshold level and the second threshold level may be predetermined. The first and the second threshold level may be fixed in some cases and changeable in some other cases.

In EV applications, the configuration of reconfigurable energy storage system 530 may be desired when no load is connected to the DC link 506. This configuration may be desired after the electric vehicle has come to a standstill or a complete stop.

Figure 5C:
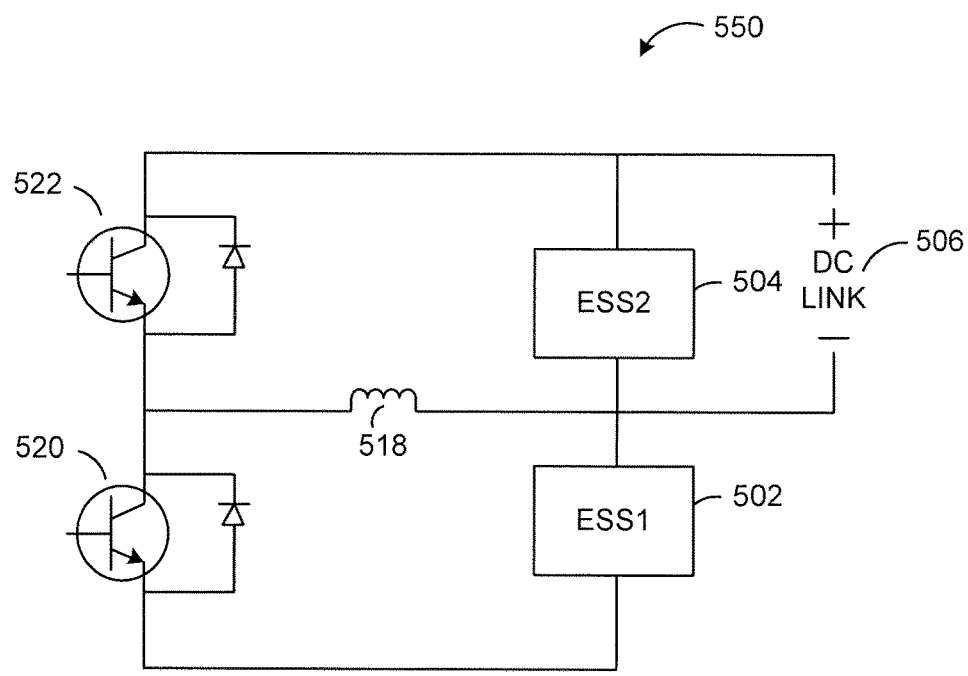
FIG. 5C illustrates the reconfigurable energy storage system of FIG. 5A with the second switch closed and the first switch open.

Reference is next made to FIG. 5C, illustrating a reconfigurable energy storage system 550 according to a second configuration. In this configuration, the second switch 514 is closed and the first switch 512 is open. Accordingly, a closed circuit path is formed including the DC link 506 and the second energy storage system 504. Another closed circuit path is formed including the DC link 506, the fourth switch 522, the third switch 520 and the first energy storage system 502. In this configuration, the first energy storage system 502 is in a parallel relationship to the second energy storage system 504, and both the first energy storage system 502 and the second energy storage system 504 are in a parallel relationship to the DC link 506.

In EV applications, the configuration of reconfigurable energy storage system 550 may be desired when the load connected to the DC link 506 requires a high current and operates within the allowable voltage range of the energy storage system that is the main source for providing power to the load. As illustrated, the main source of power to the load is the second energy storage system 504. This configuration may be desired when the electric vehicle accelerates from a stand still position.

In EV applications, the configuration of reconfigurable energy storage system 550 may also be desired when the load acts as a generator and supplies a voltage within the allowable voltage range of the main source of receiving power from the load. As illustrated, the second energy storage system 504 is the main source of receiving power from the load. This configuration may be desired during a low speed regenerative braking of the electric vehicle.

Figure 5D:
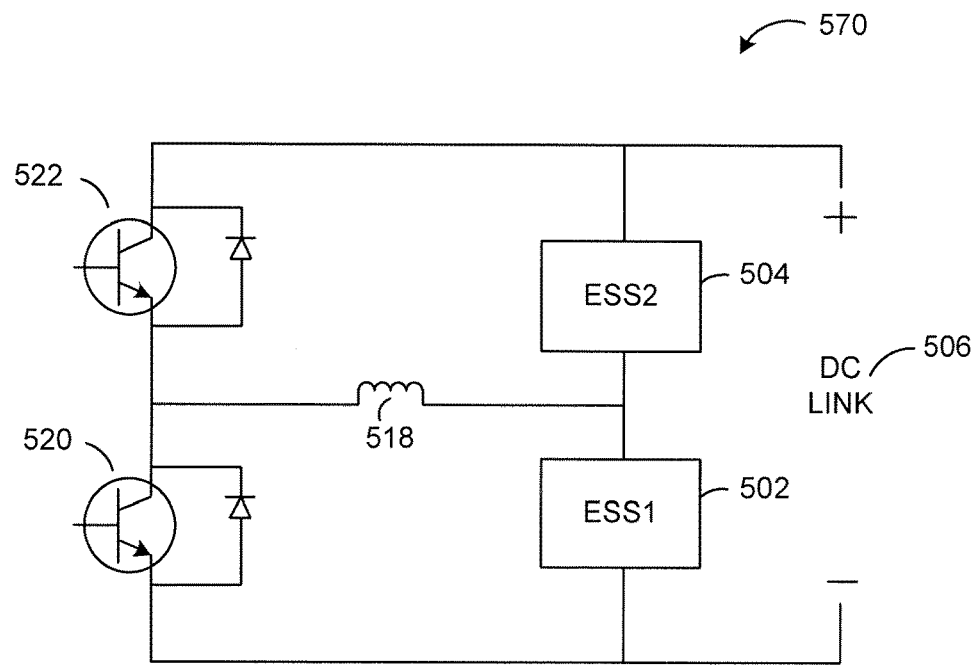
FIG. 5D illustrates the reconfigurable energy storage system of FIG. 5A with the first switch closed and the second switch open.

Reference is next made to FIG. 5D illustrating a reconfigurable energy storage system 570 according to a third configuration. In this configuration, the first switch 512 is closed and the second switch 514 is open. Accordingly, a closed circuit path is formed including the DC link 506, the second energy storage system 504 and the first energy storage system 502. In this configuration, the first energy storage system 502 and the second energy storage system 504 are in series, and this arrangement is in parallel to the DC link 506.

In cases, where the first energy storage system 502 is an energy storage system with a high energy density, such as, a battery, and the second energy storage system 504 is an energy storage system with a high power density, such as, for example, an ultracapacitor, this configuration allows the second energy storage system 504 to discharge completely through the first energy storage system 502 to achieve full energy utilization of the second energy storage system 504.

In EV applications, the configuration of reconfigurable energy storage system 570 may be desired when the load connected to the DC link 506 requires a high voltage, i.e. a voltage equal to or greater than the voltage of the main source of power to the load, which as illustrated is the second energy storage system 504. This configuration may be desired when the electric vehicle is in a high speed acceleration mode or in a constant high speed mode.

In EV applications, the configuration of reconfigurable energy storage system 570 may also be desired when the load acts as a generator and supplies a higher voltage than the maximum voltage of the main source of receiving power from the load, which as illustrated is the second energy storage system 504. In this application, the load recharges both the first energy storage system 502 and the second energy storage system 504. This configuration may be desired when the electric vehicle is in a high speed regenerative brake mode.

Reference is next made to FIG. 6, illustrating a reconfigurable energy storage system 600 according to another example embodiment. Reconfigurable energy storage system 600 comprises a first energy storage system 602, a second energy storage system 604, a DC link 606, a first switch 612, a second switch 614, a third switch 620, a fourth switch 622 and an inductor 618.

Reconfigurable energy storage system 600 is similar in structure to reconfigurable energy storage system 500 with the exception of the location of the first switch 612, the second switch 614 and the DC link 606. In the reconfigurable energy storage system 600, first switch 612 allows switching of the positive terminal of the DC link 506 to the positive terminal of the second energy storage system 504. Second switch 614 allows switching of the positive terminal of the DC link 606 to the positive terminal of the first energy storage system 502.

Figure 6A:
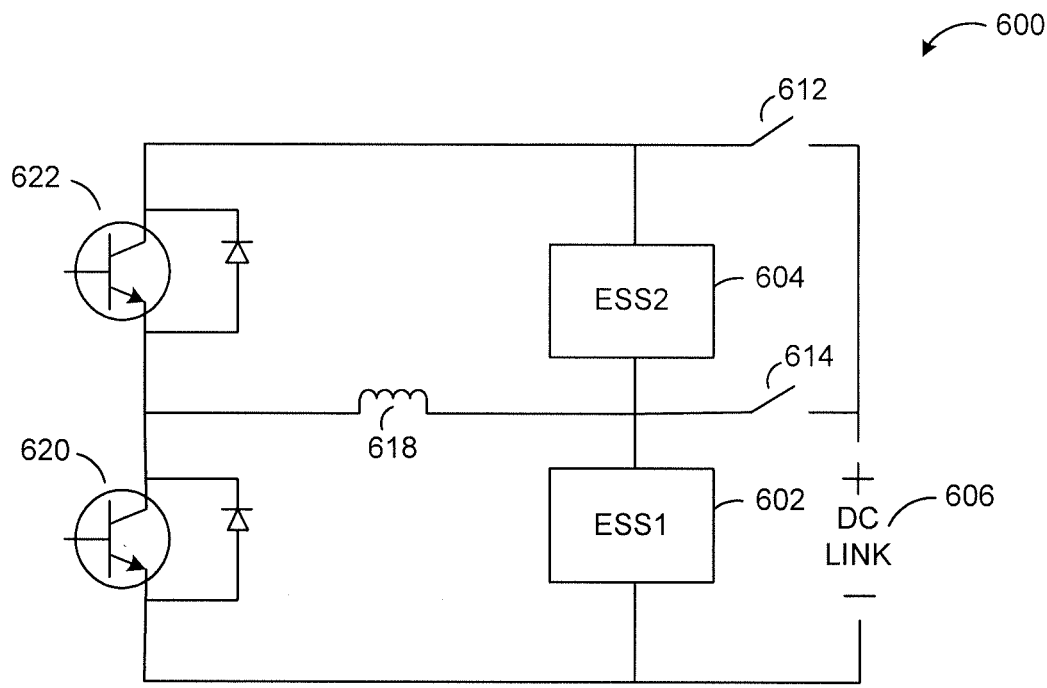
FIG. 6A illustrates a reconfigurable energy storage system according to another example embodiment.
Figure 6B:
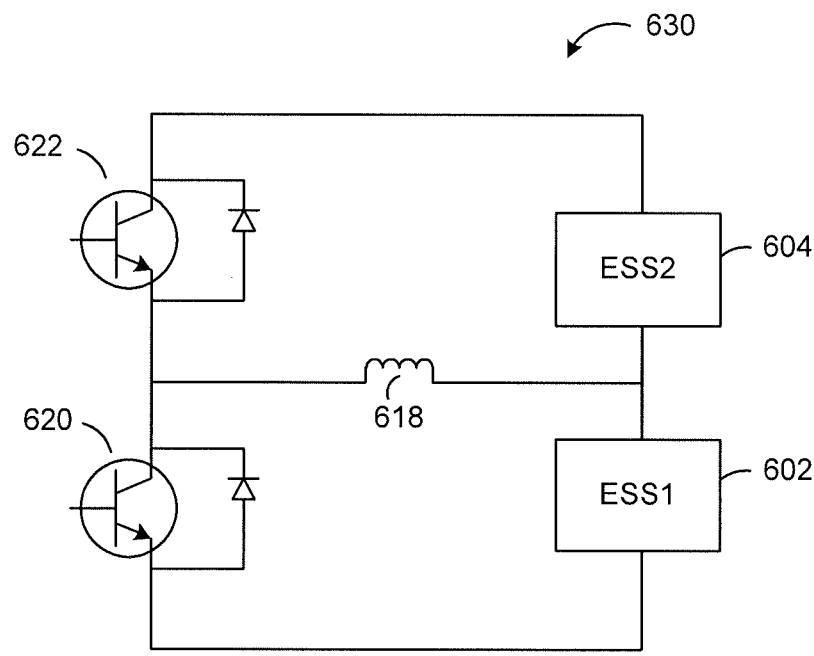
FIG. 6B illustrates the reconfigurable energy storage system of FIG. 6A with the first switch and the second switch open.

Reference is next made to FIG. 6B, illustrating a reconfigurable energy storage system 630 according to a first configuration. In this configuration, both the first switch 612 and the second switch 614 are open. Accordingly, a closed circuit path is formed including the second energy storage system 604, the first energy storage system 602, the third switch 620 and the fourth switch 622. This configuration is similar in structure and operation to the reconfigurable energy storage system 530 of FIG. 5B.

Figure 6C:
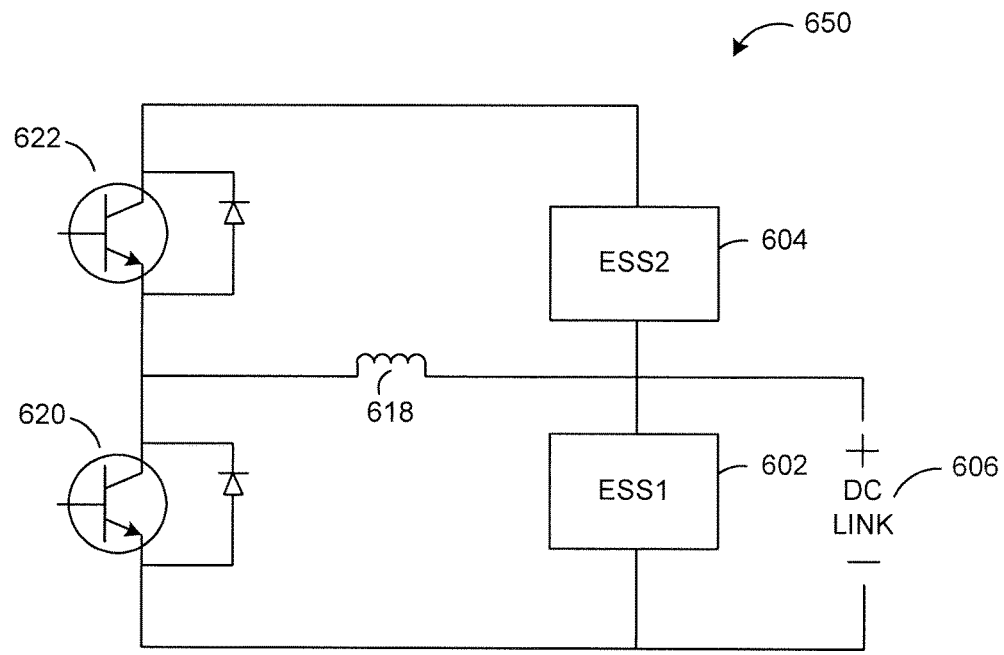
FIG. 6C illustrates the reconfigurable energy storage system of FIG. 6A with the second switch closed and the first switch open.

Reference is next made to FIG. 6C, illustrating a reconfigurable energy storage system 650 according to a second configuration. In this configuration, the first switch 612 is open and the second switch 614 is closed. The first energy storage system 602 is in a parallel relationship to the second energy storage system 604, and both the first energy storage system 602 and the second energy storage system 604 are in a parallel relationship to the DC link 606. This configuration is similar in operation to the reconfigurable energy storage system 550 of FIG. 5C.

Figure 6D:
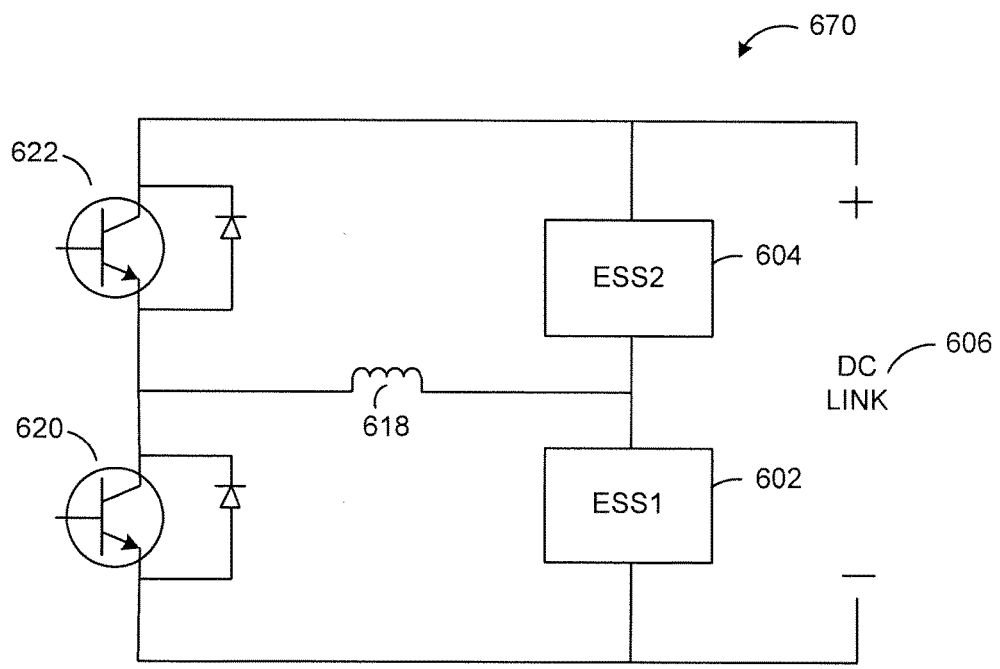
FIG. 6D illustrates the reconfigurable energy storage system of FIG. 6A with both the first switch and the second switch closed.

Reference is next made to FIG. 6D, illustrating a reconfigurable energy storage system 670 according to a third configuration. In this configuration, the first switch 612 is closed and the second switch 614 is open. Accordingly, a closed circuit path is formed including the DC link 606, the second energy storage system 604 and the first energy storage system 602. In this configuration, the first energy storage system 602 and the second energy storage system 604 are in series, and this arrangement is in parallel to the DC link 606. This configuration is similar in structure and operation to the reconfigurable energy storage system 570 of FIG. 5D.

Figure 7A:
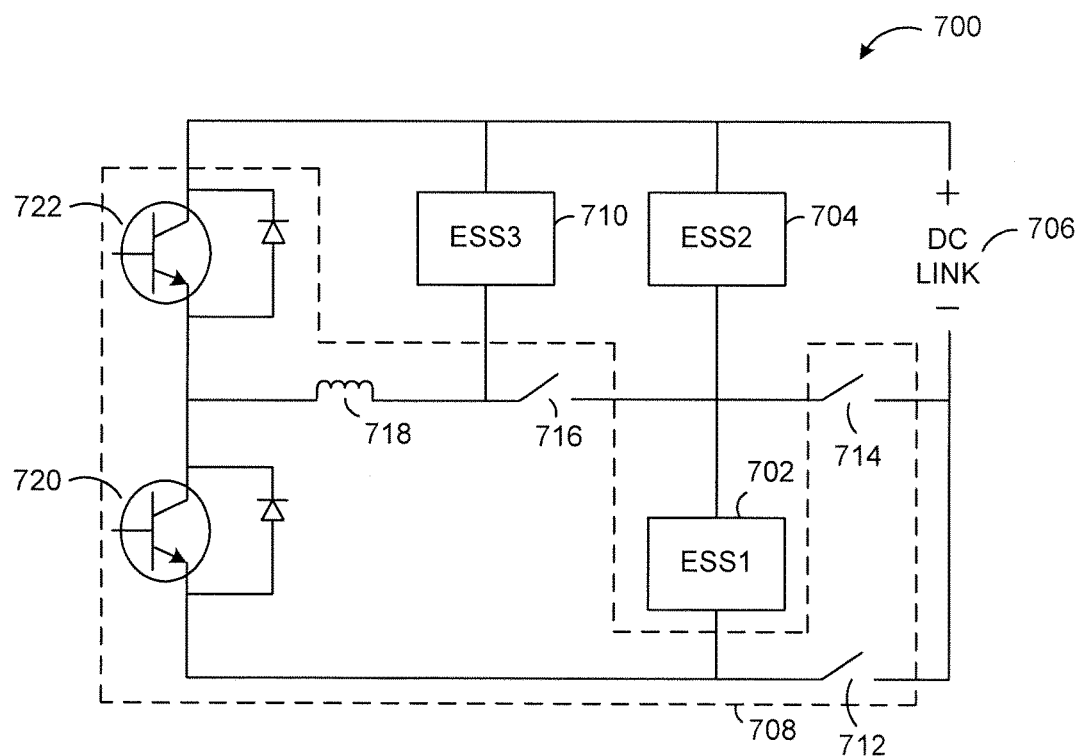
FIG. 7A illustrates a reconfigurable energy storage system according to an example embodiment.

Reference is next made to FIG. 7A, illustrating a reconfigurable energy storage system 700 according to another example embodiment. Reconfigurable energy storage system 700 may be used in hybrid electric vehicles (HEV) and plug-in hybrid electric vehicles (PHEV).

Reconfigurable energy storage system 700 comprises a first energy storage system 702, a second energy storage system 704, a third energy storage system 710, a DC link 706, and a power converter 708. Power converter 708 comprises a first switch 712, a second switch 714, a third switch 716, a fourth switch 720, a fifth switch 722 and an inductor 718.

First switch 712, a second switch 714, a third switch 716, a fourth switch 720 and a fifth switch 722 are bidirectional switches, such as, for example, the switches illustrated in FIGS. 4A-4E. First switch 712 allows switching of the negative terminal of the DC link 706 to the negative terminal of the first energy storage system 702. Second switch 714 allows switching of the negative terminal of the DC link 706 to the negative terminal of the second energy storage system 704. Third switch 716 allows the third energy storage system 710 to be connected or disconnected from the rest of the components of the reconfigurable energy storage system 700. Third switch 716 also allows the power converter 708, including the switches 712, 714, 716, 720, 722 and inductor 718, to be connected or disconnected from the rest of the components of the reconfigurable energy storage system 700.

Figure 7B:
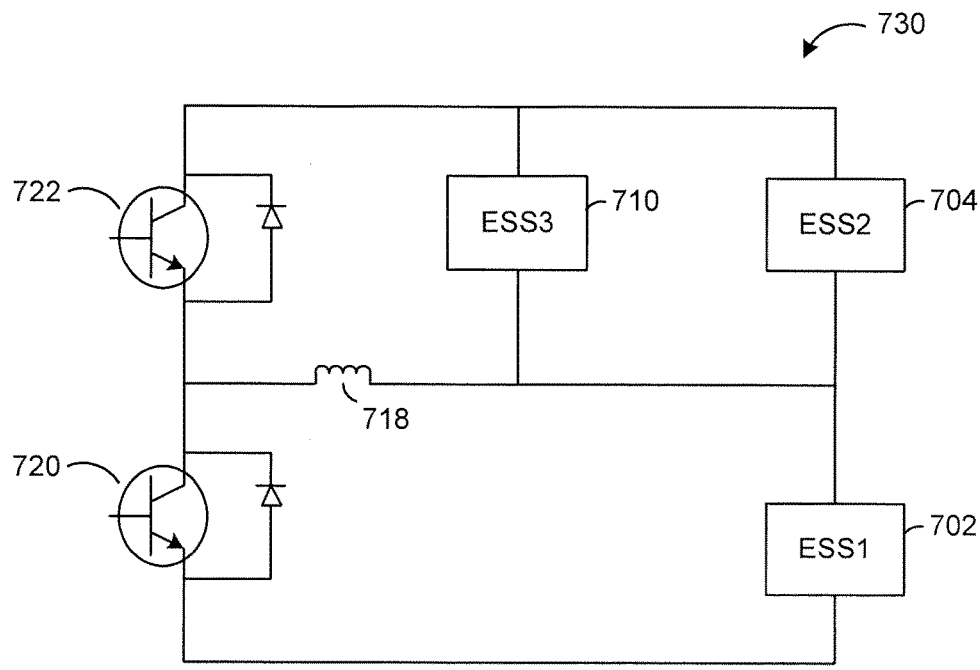
FIG. 7B illustrates the reconfigurable energy storage system of FIG. 7A with the first switch and the second switch open and the third switch closed.

Reference is made to FIG. 7B illustrating a reconfigurable energy storage system 730 according to a first configuration. In this configuration, both the first switch 712, the second switch 714 are open, and the third switch 716 is closed.

Depending on operating conditions of the energy storage systems within the reconfigurable energy storage system 730, various modes of operation may be entered into. In one mode, the first energy storage system 702 may charge the second energy storage system 704. This may be the case where the second power level corresponding to a state of charge of the second energy storage system 704 is below a second threshold and the first power level corresponding to a state of charge of the first energy storage system 702 is equal or above a first threshold.

In another mode, the second energy storage system 704 may charge the first energy storage system 702. This may be the case where the second power level corresponding to a state of charge of the second energy storage system 704 is equal or above a second threshold and the first power level corresponding to a state of charge of the first energy storage system 702 is below a first threshold.

In yet another mode, the third energy storage system 710 may charge one or both of the first energy storage system 702 and the second energy storage system 704. This may be the case where the third power level corresponding to the third energy storage system is equal or higher than the third threshold.

In some cases, the third power level may correspond to an amount of electrical energy generated by the third energy storage system 710. In some other cases, the third power level may correspond to a state of charge of the third energy storage system 710.

The first threshold, the second threshold and the third threshold may all be predetermined. The first, second and the third thresholds may be fixed in some cases and changeable in some others.

In some cases, the first energy storage system 702 is a battery, the second energy storage system 704 is an ultracapacitor and a third energy storage system 710 is an internal combustion engine-generation set (ICE-GEN). In this case, if the state of the charge of the ultracapacitor is low and that of the battery is high, then the battery may charge the ultracapacitor. In some other cases, the battery bank harvests energy captured in the ultracapacitor bank. For example, if the battery bank has a low state of charge, the ultracapacitor can recharge the battery. In some further cases, if the state of charge of the ultracapacitor as well as the battery is both low, then the ICE-GEN may charge the ultracapacitor.

In some cases, the charging of one energy storage system within the reconfigurable energy storage system 700 by another may occur directly. In some other cases, the charging of one energy storage system within the reconfigurable energy storage system 700 by another may occur indirectly through the power converter 708. As illustrated, the first energy storage system 702 charges the second energy storage system 704 directly. Likewise, the third energy storage system 710 charges the second energy storage system 704 directly. However, the third energy storage system 710 charges the first energy storage system 702 through the power converter 708.

The configuration of the reconfigurable energy storage system 730 may be desired when no load is connected to the DC link 706. This may be the case after a hybrid electric vehicle or a plug-in hybrid electric vehicle has come to a standstill or a complete stop.

Figure 7C:
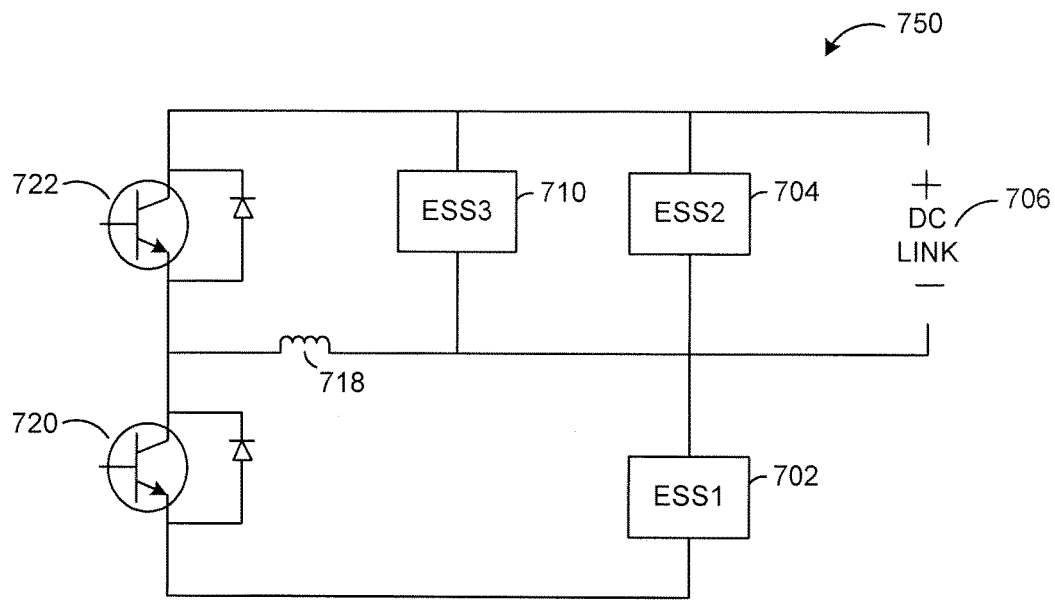
FIG. 7C illustrates the reconfigurable energy storage system of FIG. 7A with the second switch and the third switch closed and the first switch open.

Reference is next made to FIG. 7C, illustrating a reconfigurable energy storage system 750 according to a second configuration. In this configuration, the second switch 714 and the third switch 716 are closed, and the first switch 712 is open. In this configuration, the first energy storage system 702 is in a parallel relationship to the second energy storage system 704, both of which are in a parallel relationship to the third energy storage system 710 and the DC link 706.

In this configuration, a closed circuit path is formed including the DC link 706 and the second energy storage system 704. Another closed circuit path is formed connecting the first energy storage system 702 with the DC link 706 via the power converter 708. This closed circuit path includes the DC link 706, the fifth switch 722, the fourth switch 720 and the first energy storage system 702. Another closed circuit path is formed including the DC link 706, In this configuration, the first energy storage system 702 is in a parallel relationship to the second energy storage system 704, and both the first energy storage system 702 and the second energy storage system 704 are in a parallel relationship to the DC link 706.

In HEV and PHEV applications, the configuration of reconfigurable energy storage system 750 may be desired when the load connected to the DC link 706 requires a high current and operates within the allowable voltage range of the main source for providing power to the load. As illustrated, the main source for providing power to the load is the second energy storage system 704. This configuration may be desired when the electric vehicle accelerates from a stand still position. For maximum current demand by the load, the first energy storage system 702, the second energy storage system 704 and the third energy storage system 710 and the power converter 708 may operate to their maximum current output capabilities.

The configuration of reconfigurable energy storage system 750 may also be desired in HEV and PHEV applications when the load acts as a generator and supplies a voltage within the allowable voltage range of the main source of receiving the power from the load. As illustrated, the main source of receiving power from the load is the second energy storage system 704. This may be the case during a low speed regenerative braking of the hybrid or the plug-in hybrid vehicle.

Figure 7D:
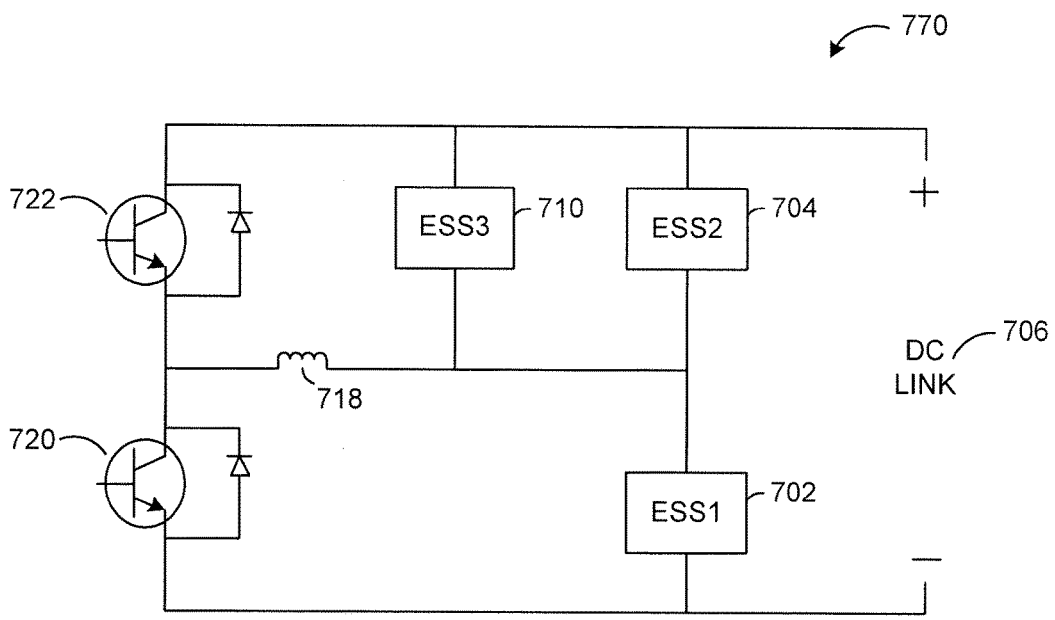
FIG. 7D illustrates the reconfigurable energy storage system of FIG. 7A with the first switch and the third switch closed and the second switch open.

Reference is next made to FIG. 7D illustrating a reconfigurable energy storage system 770 according to a third configuration. In this configuration, the first switch 712 and the third switch 716 are closed, and the second switch 714 is open. In this configuration, the first energy storage system 702 and the second energy storage system 704 are in series and the third energy storage system 710 is connected in parallel to the second energy storage system 704.

In some cases, where the first energy storage system 702 is a battery and the second energy storage system 704 is an ultracapacitor, this configuration allows the ultracapacitor to discharge completely through the battery to achieve full energy utilization of the second energy storage system 704.

In HEV and PHEV applications, the configuration of reconfigurable energy storage system 770 may be desired when the load connected to the DC link 706 requires a high voltage, i.e. a voltage equal to or greater than the main source of power to the load. In series configuration, the combination of first energy storage system 702 and second energy storage system 704 is the main source of power to the load. This configuration may be desired when the HEV or the PHEV is operating at a constant speed with a near zero acceleration.

In HEV and PHEV applications, the configuration of reconfigurable energy storage system 770 may also be desired when the load acts as a generator and supplies a higher voltage than maximum voltage of the main source of receiving power from the load. As illustrated, the main source of receiving power from the load is the second energy storage system 704. In this application, the load recharges both the first energy storage system 702 and the second energy storage system 704. This configuration may be desired when the HEV or the PHEV is in a high speed regenerative brake mode.

In some cases, the third energy storage system 710 may charge the ultracapacitor and/or the battery. The third energy storage system 710 may do so simultaneously when the load charges the first 702 or the second 704 energy storage system. The third energy storage system 710 alternatively or additionally do so when the state of charge of one or both of the first energy storage system 702 and the second energy storage system 704 is below the first and the second threshold respectively.

Figure 8A:
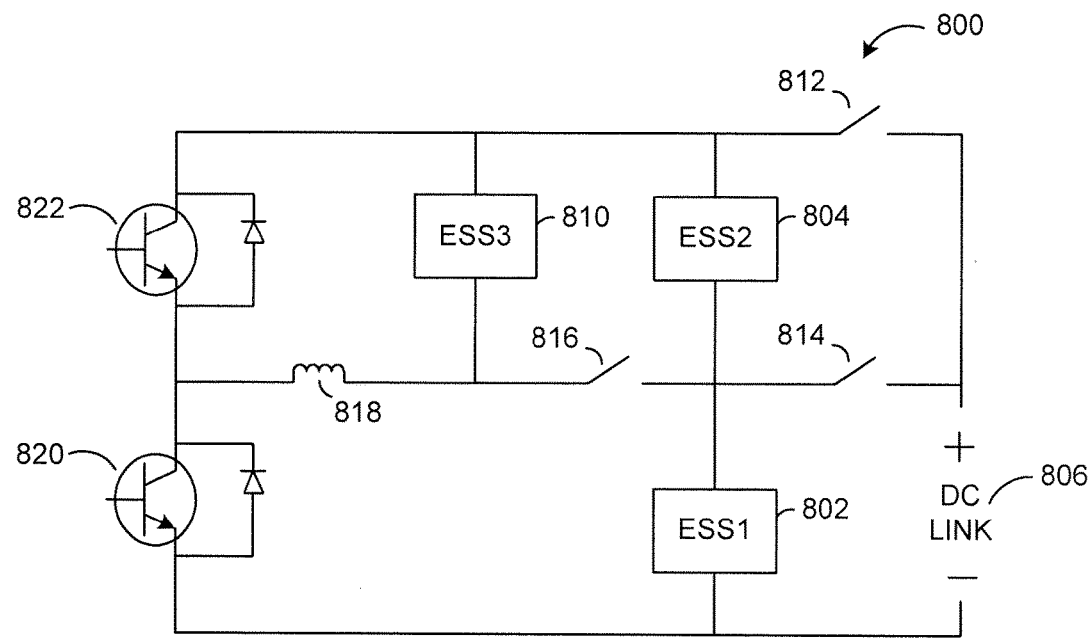
FIG. 8A illustrates a reconfigurable energy storage system according to another example embodiment.

Reference is next made to FIG. 8A, illustrating a reconfigurable energy storage system 800 according to another example embodiment. Reconfigurable energy storage system 800 comprises a first energy storage system 802, a second energy storage system 804, a third energy storage system 810, a DC link 806, a first switch 812, a second switch 814, a third switch 816, a fourth switch 820, a fifth switch 822 and an inductor 818.

Reconfigurable energy storage system 800 is similar in structure to the reconfigurable energy storage system 700 with the exception of the location of the first switch 812, the second switch 814 and the DC link 806. In the reconfigurable energy storage system 800, the first switch 812 allows switching of the positive terminal of the DC link 806 to the positive terminal of the second energy storage system 804.

Second switch 814 allows switching of the positive terminal of the DC link 806 to the positive terminal of the first energy storage system 802.

In the configuration illustrated in FIG. 8A, the reconfigurable energy storage system 800 is similar in operation and structure to the reconfigurable energy storage system 730 of FIG. 7B when the first switch 812 and the second switch 814 are open and the third switch 816 is closed.

The reconfigurable energy storage system 800 is similar in operation and structure to the reconfigurable energy storage system 770 of FIG. 7D when the first switch 812 and the third switch 816 are closed and the second switch 814 is open.

Figure 8B:
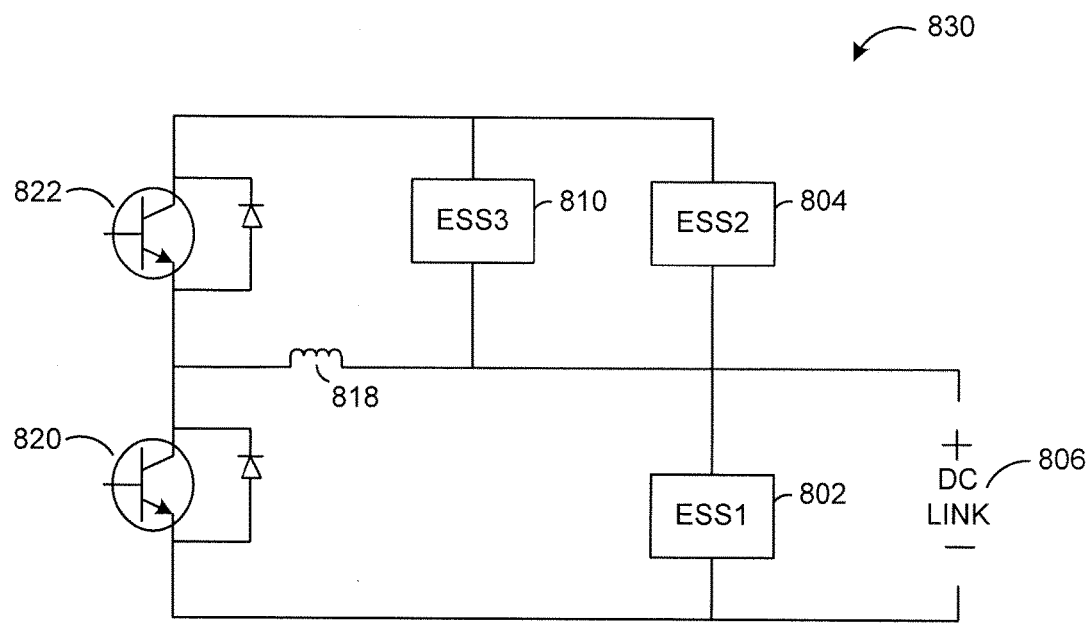
FIG. 8B illustrates the reconfigurable energy storage system of FIG. 8A with the second switch and the third switch closed and the first switch open.

References is next made to FIG. 8B illustrating a reconfigurable energy storage system 830 according to an example configuration. In this configuration, the first switch 812 is open, and the second switch 814 and the third switch 816 are closed. Accordingly, the first energy storage system 802 is in a parallel relationship to the second energy storage system 804, both of which are in a parallel relationship to the third energy storage system 810 and the DC link 806. Reconfigurable energy storage system 830 is operationally similar to the reconfigurable energy storage system 750 of FIG. 7C.

Figure 9:
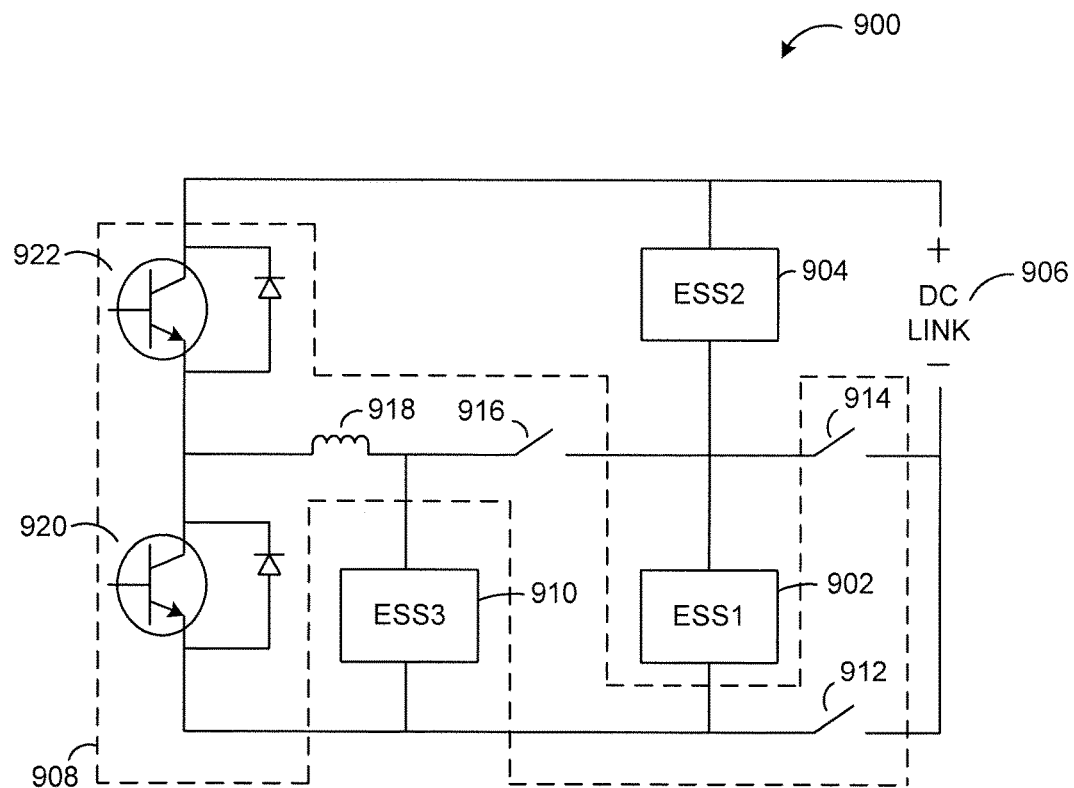
FIG. 9 illustrates a reconfigurable energy storage system according to an example embodiment.

Reference is next made to FIG. 9, illustrating a reconfigurable energy storage system 900 according to another example embodiment. Reconfigurable energy storage system 900 comprises a first energy storage system 902, a second energy storage system 904, a third energy storage system 910, a DC link 906, and a power converter 908. Power converter 908 comprises a first switch 912, a second switch 914, a third switch 916, a fourth switch 920, a fifth switch 922 and an inductor 918.

Reconfigurable energy storage system 900 is similar in structure to the reconfigurable energy storage system 700 with the exception of the location of the third energy storage system 910. In the reconfigurable energy storage system 900, the third energy storage system 910 is located in parallel to the first energy storage system 902.

Reconfigurable energy storage system 900 is similar in operation to the reconfigurable energy storage system 700 of FIG. 7A and the various configurations of FIGS. 7B to 7D. Reconfigurable energy storage system 900 differs from the reconfigurable energy storage systems of FIGS. 7A-7D in that the third energy storage system 910 charges the first energy storage system 902 directly and charges the second energy storage system 904 indirectly via the power converter 908.

Figure 10:
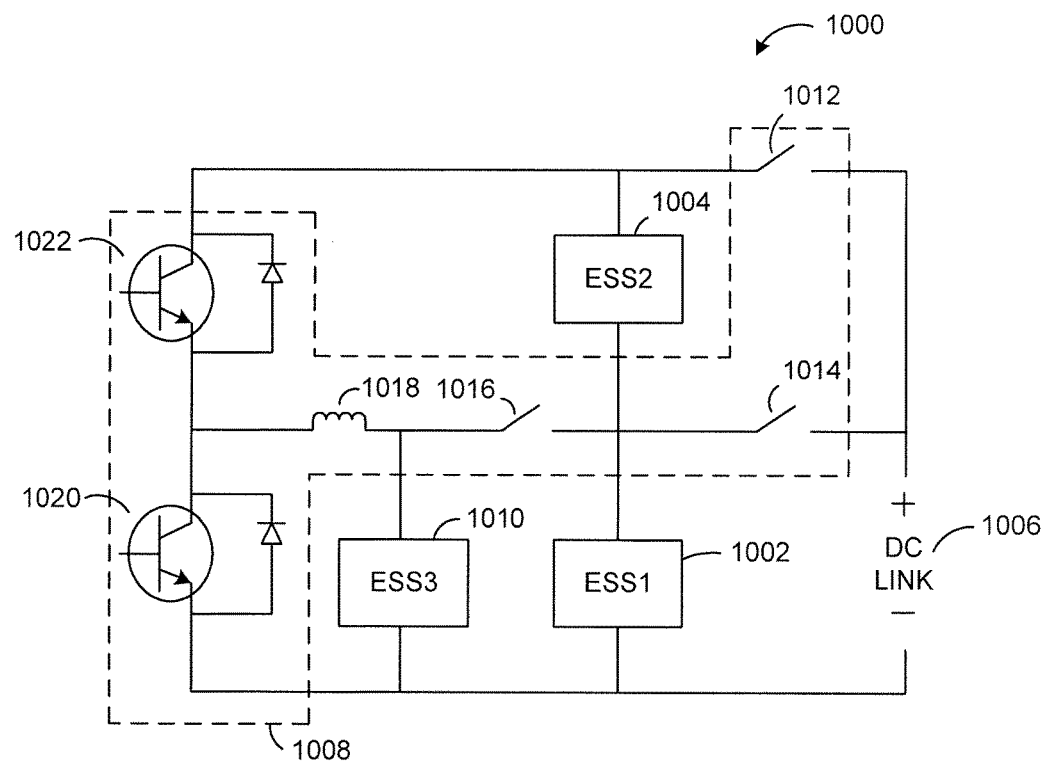
FIG. 10 illustrates a reconfigurable energy storage system according to another example embodiment.

Reference is next made to FIG. 10, illustrating a reconfigurable energy storage system 1000 according to another example embodiment. Reconfigurable energy storage system 1000 comprises a first energy storage system 1002, a second energy storage system 1004, a third energy storage system 1010, a DC link 1006, and a power converter 1008. Power converter 1008 comprises a first switch 1012 a second switch 1014, a third switch 1016, a fourth switch 1020, a fifth switch 1022 and an inductor 1018.

Reconfigurable energy storage system 1000 is similar in structure to the reconfigurable energy storage system 800 of FIG. 8A with the exception of the location of the third energy storage system 1010. In the reconfigurable energy storage system 1000, the third energy storage system 1010 is located in parallel to the first energy storage system 1002.

Similar to reconfigurable energy storage system 900 of FIG. 9, the third energy storage system 1010 may charge the first energy storage system 1002 directly and the second energy storage system 1004 indirectly through the power converter 1008.

Figure 15:
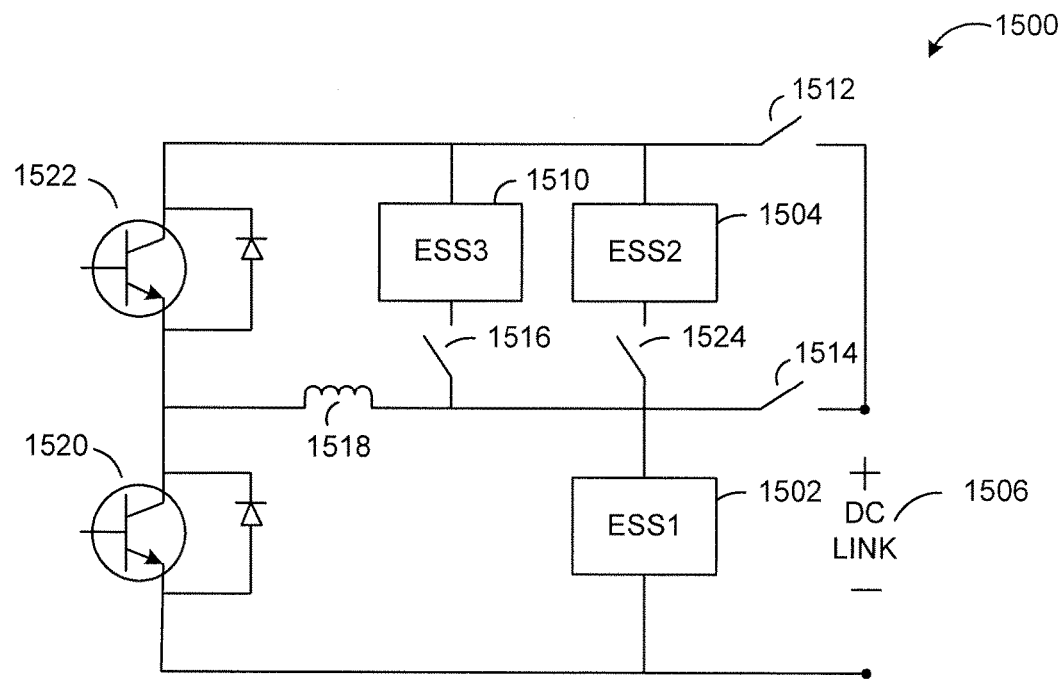
FIG. 15 illustrates a reconfigurable energy storage system according to an example embodiment.

Reference is next made to FIG. 15, illustrating a reconfigurable energy storage system 1500 according to another example embodiment. Reconfigurable energy storage system 1500 comprises a first energy storage system 1502, a second energy storage system 1504, a third energy storage system 1510, a DC link 1506, a first switch 1512, a second switch 1514, a third switch 1516, a fourth switch 1520, a fifth switch 1522, a sixth switch 1524 and an inductor 1518.

Reconfigurable energy storage system 1500 is similar in structure to the reconfigurable energy storage system 800 with the exception of the location of the third switch 1516 and the addition of a sixth switch 1524. In the reconfigurable energy storage system 1500, the third switch 1516 is located between the negative terminal of the third energy storage system 1510 and the positive terminal of the first energy storage system 1502, and the sixth switch 1524 is located between the negative terminal of the second energy storage system 1504 and the positive terminal of the first energy storage system 1502.

Reconfigurable energy storage system 1500 is similar in operation to the various configurations of reconfigurable energy storage systems 800 and 830 of FIGS. 8A and 8B, respectively. For example, reconfigurable energy storage system 1500 is similar in operation to reconfigurable energy storage system 830 of FIG. 8B when the second switch 1514, the third switch 1516, and the fourth switch 1520 are closed, and the fifth switch 1522 and the sixth switch 1524 are active, and the first switch 1512 is open.

In some cases, the first energy storage system 1502 is an ultracapacitor, the second energy storage system 1504 is a battery and the third energy storage system 1510 is an ICE-GEN set. In such cases, the reconfigurable energy storage system 1500 may operate as a buck-boost converter, where the first energy storage system 1502 provides power to and receives power from the DC link 1506.

In the buck-boost configuration, the first operating condition includes charging of the inductor 1518 by the third energy storage system 1510, and discharging of the first energy storage system 1502 to provide power to the DC link 1506. In this operating condition, the first switch 1512, the sixth switch 1524 and the fourth switch 1520 are open, and the second switch 1514 and the third switch 1516 are closed, and the fifth switch 1522 is active. In some other cases, the inductor 1518 may be charged by the second energy storage system 1504. In this operating condition, the first switch 1512, the third switch 1516 and the fourth switch 1520 are open, and the second switch 1514, the sixth switch 1524 and the fifth switch 1522 are closed.

In the second operating condition, the first energy storage device 1502 is charged by the inductor 1518. In this operating condition, the fifth switch 1520 is closed, and the first switch 1512, the second switch 1514, the third switch 1516, the fifth switch 1522 and the sixth switch 1524 are open.

Figure 16A:
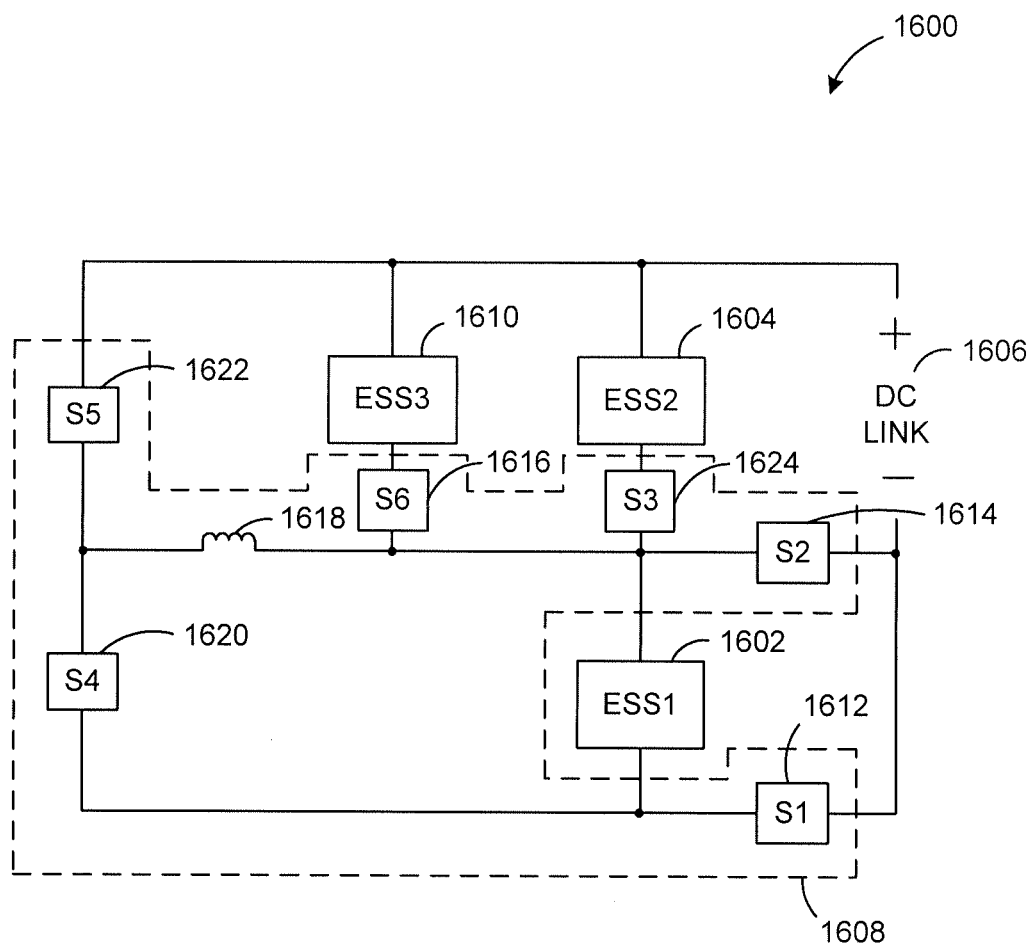
FIG. 16A illustrates a reconfigurable energy storage system according to an example embodiment.

Reference is next made to FIG. 16A, illustrating a reconfigurable energy storage system 1600 according to another example embodiment. Reconfigurable energy storage system 1600 comprises a first energy storage system 1602, a second energy storage system 1604, a third energy storage system 1610, a DC link 1606, and a power converter 1608. Power converter 1608 comprises a first switch 1612, a second switch 1614, a third switch 1624, a fourth switch 1620, a fifth switch 1622, a sixth switch 1616 and an inductor 1618.

Reconfigurable energy storage system 1600 is similar in structure to the reconfigurable energy storage system 1500 with the exception of the location of the first switch 1612. In the reconfigurable energy storage system 1600, the first switch 1612 is located between the negative terminal of the first energy storage system 1602 and the negative terminal of the DC link, the second switch 1614 is located between the positive terminal of the first energy storage system 1602 and the negative terminal of the DC link, the third switch 1624 is located between the negative terminal of the second energy storage system 1604 and the positive terminal of the first energy storage system 1602, and the sixth switch 1616 is located between the negative terminal of the third energy storage system 1610 and the positive terminal of the first energy storage system 1602.

Figure 16B:
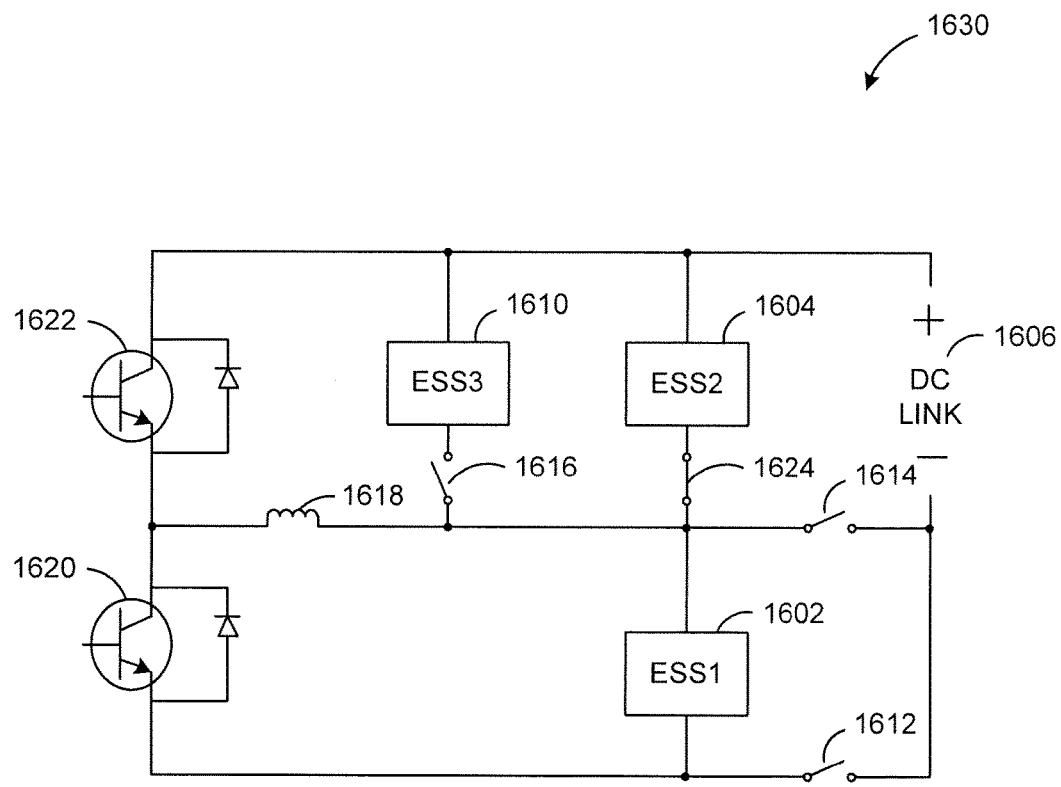
FIG. 16B illustrates the reconfigurable energy storage system of FIG. 16A with the third switch closed, and the fourth switch and the fifth switch active, and the first switch, the second switch and the sixth switch open.

Reference is next made to FIG. 16B illustrating a reconfigurable energy storage system 1630, which is similar in structure to the reconfigurable energy storage system 1600 with the third switch 1624 closed, and the fourth switch 1620 and the fifth switch 1622 active. Accordingly, a closed circuit path is formed including the first energy storage system 1602, the third switch 1624, the second energy storage system 1604, the fourth switch 1620, the fifth switch 1622 and the inductor 1618.

The structure and the operation of the reconfigurable energy storage system 1630 is identical to reconfigurable energy storage system 530 of FIG. 5B. This configuration of the reconfigurable energy storage system 1630 allows the energy transfer between the first energy storage system 1602 and the second energy storage system 1604.

Figure 16C:
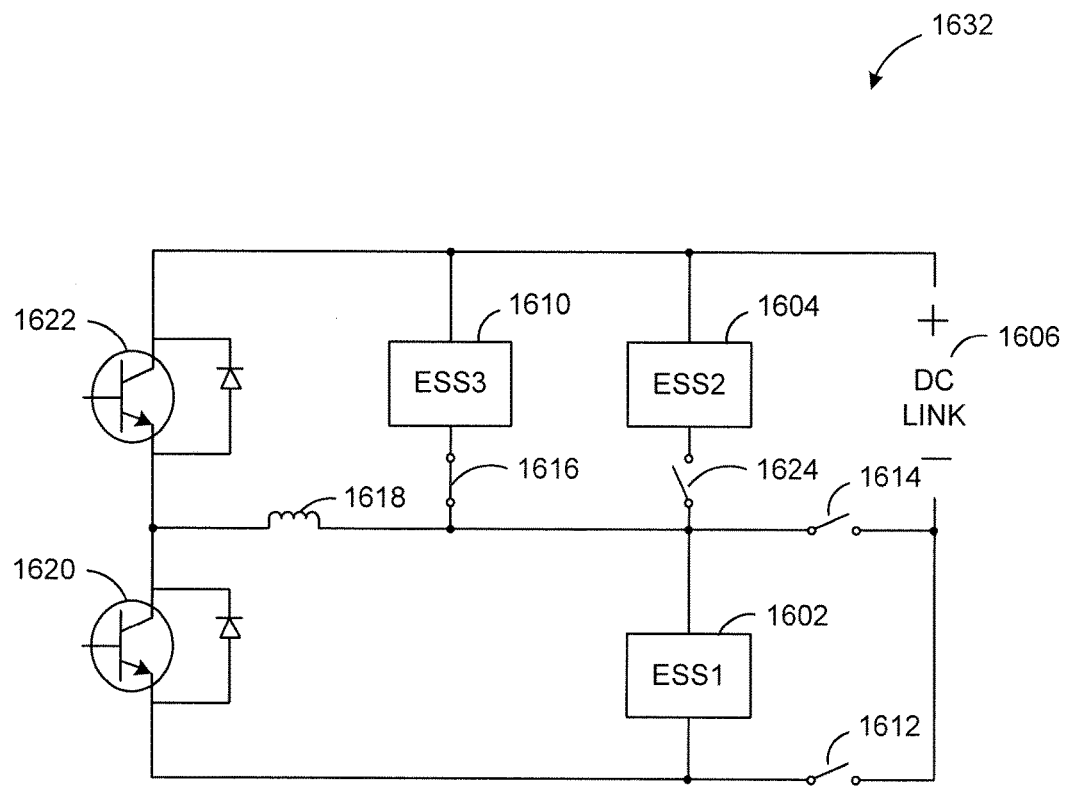
FIG. 16C illustrates the reconfigurable energy storage system of FIG. 16A with the fourth switch and the fifth switch active, and the sixth switch closed, and the first switch, the second switch and the third switch open.

Reference is next made to FIG. 16C illustrating a reconfigurable energy storage system 1632, which is similar in structure to the reconfigurable energy storage system 1600 with the fourth switch 1620 and the fifth switch 1622 active, and the sixth switch 1616 closed. Accordingly, a closed circuit path is formed including the first energy storage system 1602, the third energy storage system 1610, the fourth switch 1620, the fifth switch 1622, the sixth switch 1616 and the inductor 1618.

The structure and the operation of the reconfigurable energy storage system 1632 is similar to reconfigurable energy storage system 530 of FIG. 5B and reconfigurable energy storage system 1632 of FIG. 16C. This configuration of the reconfigurable energy storage system 1630 allows the energy transfer between the first energy storage system 1602 and the third energy storage system 1610.

Figure 16D:
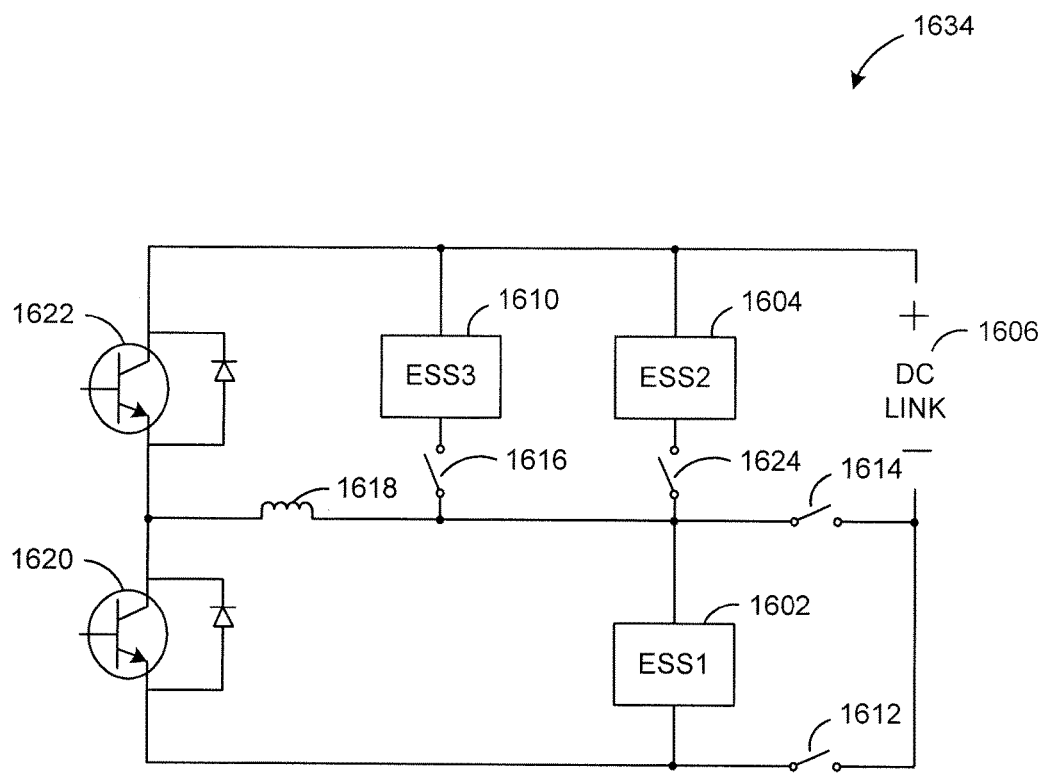
FIG. 16D illustrates the reconfigurable energy storage system of FIG. 16A with all six switches open.

Reference is next made to FIG. 16D illustrating a reconfigurable energy storage system 1634, which is similar in structure to the reconfigurable energy storage system 1600 with the first switch 1612, the second switch 1614, the third switch 1624, the fourth switch 1620, the fifth switch 1622 and the sixth switch 1616 open. In this configuration, no closed circuit path is formed, and accordingly, there are no possible energy paths between the various energy storage systems.

Figure 16E:
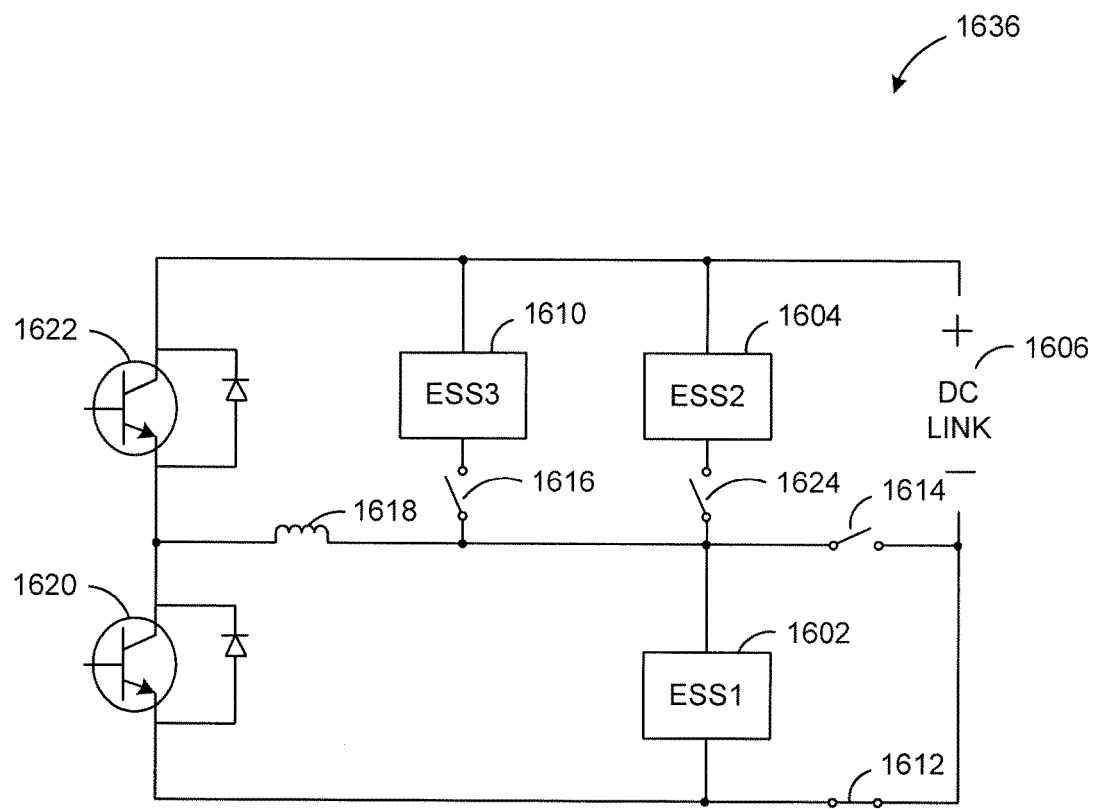
FIG. 16E illustrates the reconfigurable energy storage system of FIG. 16A with the first switch closed, and the fourth switch and the fifth switch active, and the second switch, the third switch and the sixth switch open.

Reference is next made to FIG. 16E illustrating a reconfigurable energy storage system 1636, which is similar in structure to the reconfigurable energy storage system 1600 with the first switch 1612 closed, and the fourth switch 1620 and the fifth switch 1622 active. Accordingly, a closed circuit path is formed including the first energy storage system 1602, the fourth switch 1620 and the fifth switch 1622 and the inductor 1618. This configuration allows the energy flow between the DC link 1606 and the first energy system 1602 via the inductor 1618, the fourth switch 1620 and the fifth switch 1622.

Figure 16F:
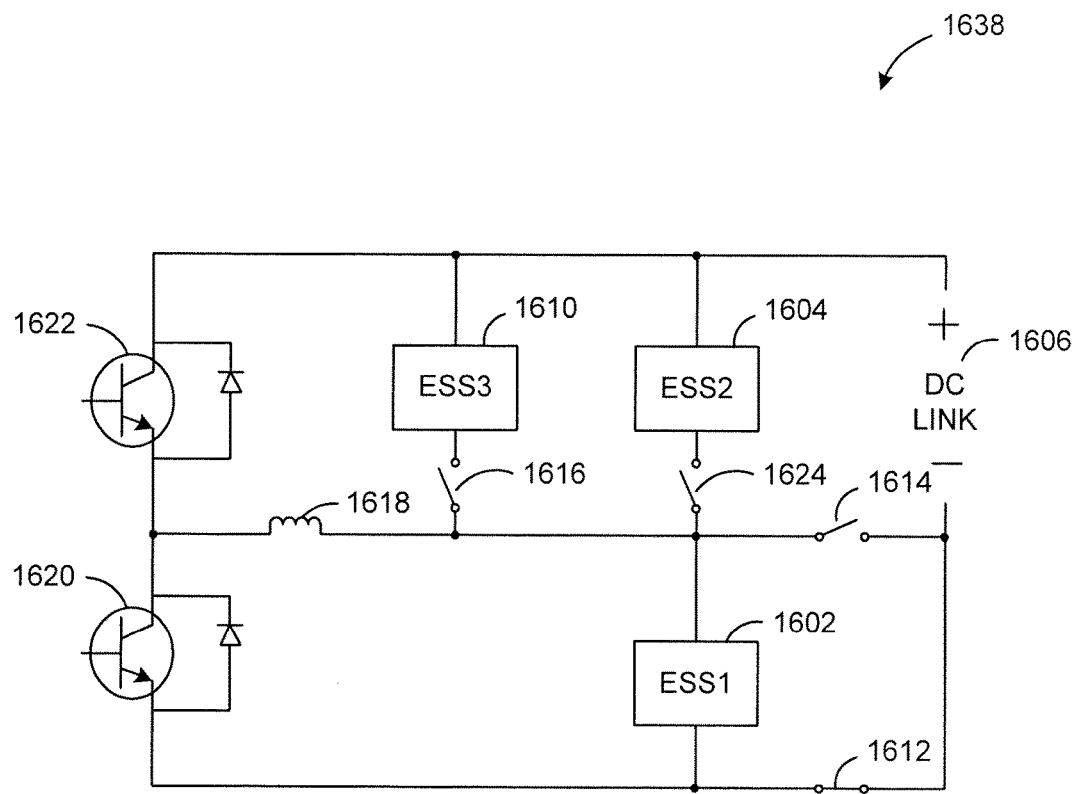
FIG. 16F illustrates the reconfigurable energy storage system of FIG. 16A with the first switch closed, and the fifth switch active, and the second switch, the third switch, fourth switch and the sixth switch open.

Reference is next made to FIG. 16F illustrating a reconfigurable energy storage system 1638, which is similar in structure to the reconfigurable energy storage system 1600 with the first switch 1612 closed, and the fifth switch 1622 active. Accordingly, a closed circuit path is formed including the first energy storage system 1602, the fifth switch 1622 and the inductor 1618. This configuration allows the energy flow between the DC link 1606 and the first energy storage system 1602 via the fifth switch 1622.

Figure 16G:
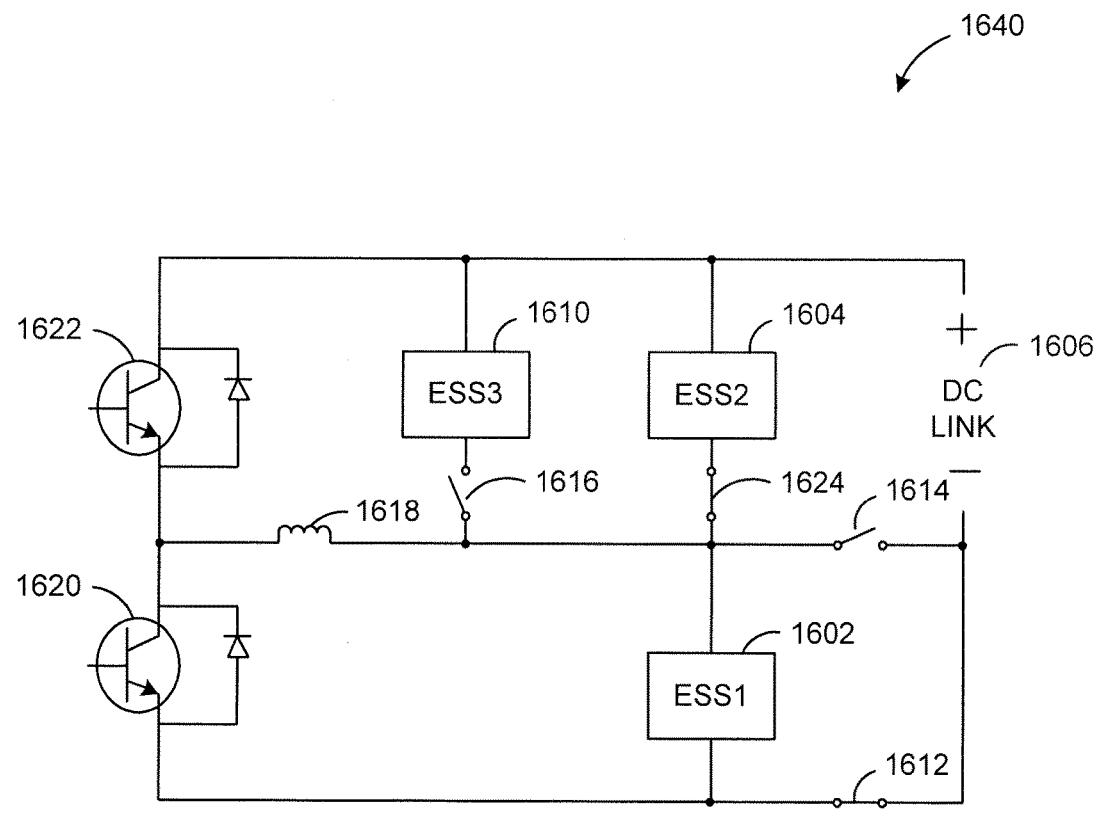
FIG. 16G illustrates the reconfigurable energy storage system of FIG. 16A with the first switch and the third switch closed, and the fourth switch and the fifth switch active, and the second switch and the sixth switch open.

Reference is next made to FIG. 16G illustrating a reconfigurable energy storage system 1640, which is similar in structure to the reconfigurable energy storage system 1600 with the first switch 1612, the third switch 1624, the fourth switch 1620 and the fifth switch 1622 closed.

Accordingly, one closed circuit path including the DC link 1606, the first energy storage system 1602 and the second energy storage system 1604 is formed. In this configuration, the first energy storage system 1602 and the second energy storage system 1604 are in series, and this arrangement is in parallel to the DC link 1606. Another closed circuit path including the first energy storage system 1602, the second energy storage system 1604, the third switch 1624, the fourth switch 1620, the fifth switch 1622 and the inductor 1618.

In cases where the first energy storage system 1602 is an energy storage system with a high energy density, such as, a battery, and the second energy storage system 1604 is an energy storage system with a high power density, such as, for example, an ultracapacitor, this configuration allows the second energy storage system 1604 to discharge completely through the first energy storage system 1602 to achieve full energy utilization of the second energy storage system 1604.

Similarly, in cases where the first energy storage system 1602 is an energy storage system with a high power density and the second energy storage system 1604 is an energy storage system with a high energy density, this configuration allows the first energy system 1602 to discharge completely through the second energy storage system 1604. Accordingly, in this configuration, the energy flow can occur between the first energy storage system 1602 and the second energy storage system 1604 via the fourth switch 1620, the fifth switch 1622 and the inductor 1618.

Also in this configuration, the energy flow can occur between the first energy storage system 1602 and the second energy storage system 1604, and the DC link 1606. In EV applications, the configuration of reconfigurable energy storage system 1640 may be desired when the load connected to the DC link 1606 requires a high voltage, i.e. a voltage equal to or greater than any one of the energy storage systems, i.e. the first energy storage system 1602 or the second energy storage system 1604. This configuration may be desired when the electric vehicle is in a high speed acceleration mode or in a constant high speed mode.

This configuration of reconfigurable energy storage system 1640 may also be desired when the load acts as a generator. In this application, the load recharges both the first energy storage system 1602 and the second energy storage system 1604. This configuration may be desired when the electric vehicle is in a high speed regenerative brake mode.

Figure 16H:
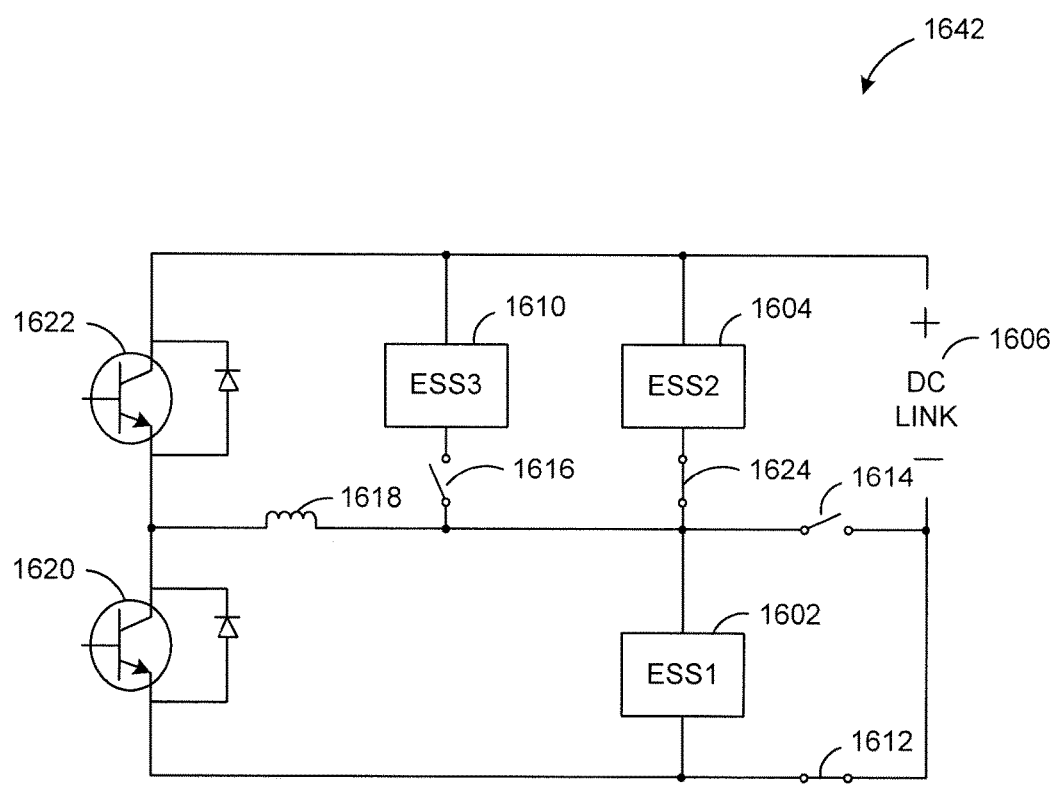
FIG. 16H illustrates the reconfigurable energy storage system of FIG. 16A with the first switch and the third switch closed, and the second switch, the fourth switch, the fifth switch and the sixth switch open.

Reference is next made to FIG. 16H illustrating a reconfigurable energy storage system 1642, which is similar in structure to the reconfigurable energy storage system 1600 with the first switch 1612 and the third switch 1624 closed. Accordingly, a closed circuit path is formed including the first energy storage system 1602, the second energy storage system 1604 and the DC link 1606. This configuration allows the energy flow between the DC link 1606 and the series configuration of the first energy storage system 1602 and the second energy storage system 1604.

Figure 16I:
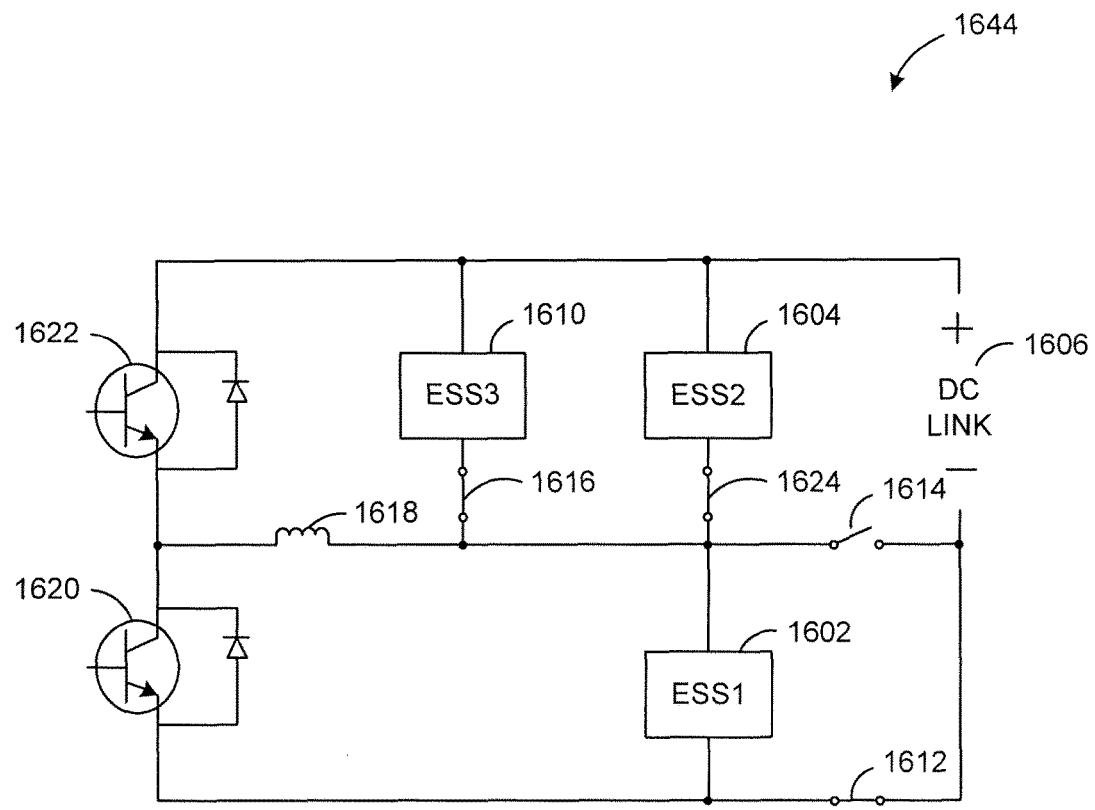
FIG. 16I illustrates the reconfigurable energy storage system of FIG. 16A with the first switch, the third switch, and the sixth switch closed, and the fourth switch and the fifth switch active, and the second switch open.

Reference is next made to FIG. 16I illustrating a reconfigurable energy storage system 1644, which is similar in structure to the reconfigurable energy storage system 1600 with the first switch 1612, the third switch 1624, and the sixth switch 1616 closed, and the fourth switch 1620 and the fifth switch 1622 active. Accordingly, one closed circuit path is formed including the first energy storage system 1602, the second energy storage system 1604 and the third energy storage system 1610 in a parallel configuration, the fourth switch 1620, and the fifth switch 1622.

A closed circuit path is also formed including the second energy storage system 1604 and the third energy storage system 1610 in a parallel configuration, which is in series with the first energy storage system 1602, which combination is in a parallel configuration with the DC link 1606.

The structure and the operation of the reconfigurable energy storage system 1644 is similar to reconfigurable energy storage system 770 of FIG. 7D. In one case, this configuration of the reconfigurable energy storage system 1644 allows the energy transfer between the first energy storage system 1602 and the parallel arrangement of the second energy storage system 1604 and the third energy storage system 1610. In another case, this configuration of the reconfigurable energy storage system 1644 allows the energy transfer between the DC link 1606, and the first energy storage system 1602, the second energy storage system 1604 and the third energy storage system 1610.

Figure 16J:
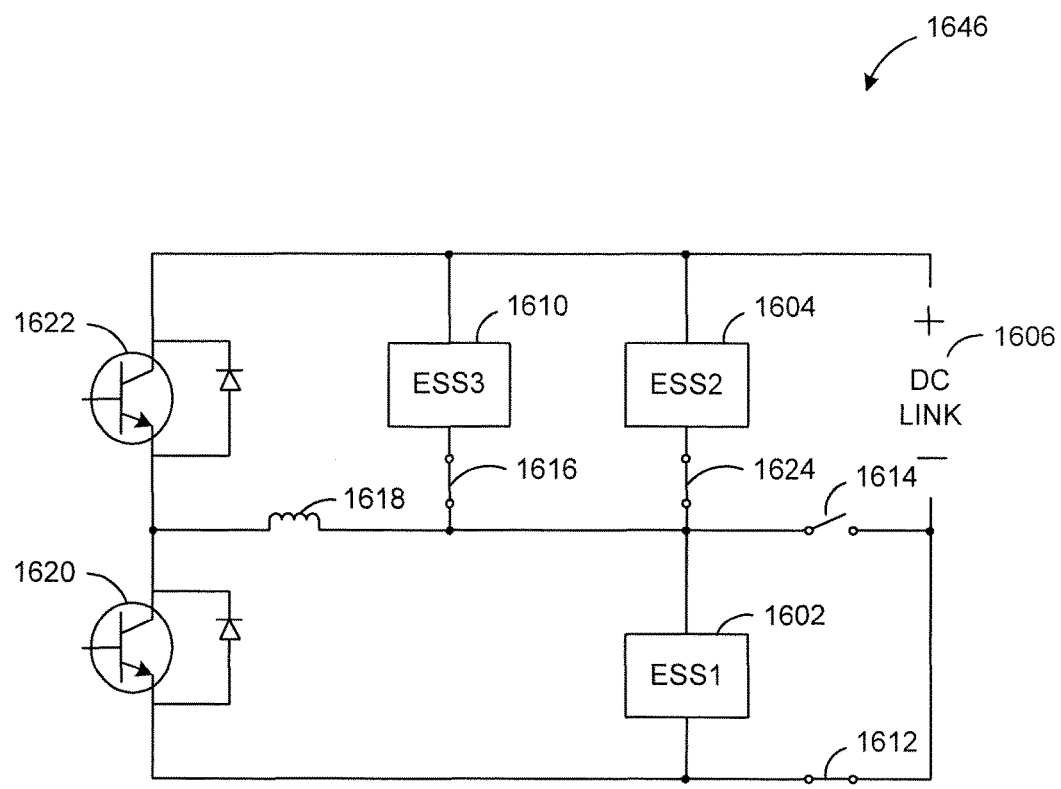
FIG. 16J illustrates the reconfigurable energy storage system of FIG. 16A with the first switch, the third switch and the sixth switch closed, and the second switch, the fourth switch, the fifth switch open.

Reference is next made to FIG. 16J illustrating a reconfigurable energy storage system 1646, which is similar in structure to the reconfigurable energy storage system 1600 with the first switch 1612, the third switch 1624, and the sixth switch 1616 closed. A closed circuit path is formed including the DC link 1606 in parallel with a series configuration of the first energy storage system 1602 with the parallel arrangement of the second energy storage system 1604 and the third energy storage system 1610. Accordingly, the reconfigurable energy storage system 1646 allows the energy transfer to occur between the DC link 1606 and the first energy storage system 1602, the second energy storage system 1604 and the third energy storage system 1610.

Figure 16K:
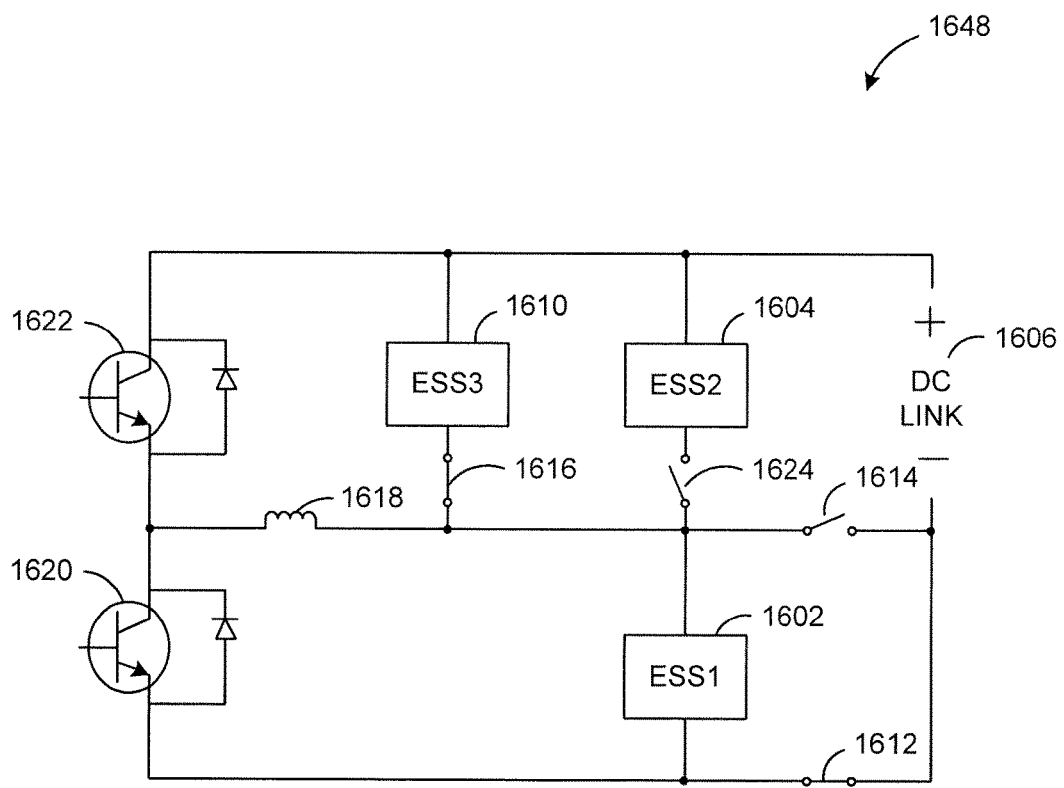
FIG. 16K illustrates the reconfigurable energy storage system of FIG. 16A with the first switch and the sixth switch closed, and the fourth switch and the fifth switch active, and the second switch and the third switch open.

Reference is next made to FIG. 16K illustrating a reconfigurable energy storage system 1648, which is similar in structure to the reconfigurable energy storage system 1600 with the first switch 1612 and the sixth switch 1616 closed, and the fourth switch 1620 and the fifth switch 1622 active. The structure and function of the reconfigurable energy storage system 1648 is identical to that of the reconfigurable energy storage system 1640 of FIG. 16G with the exception of having the third energy storage system 1610 replace the second energy system 1604.

Figure 16L:
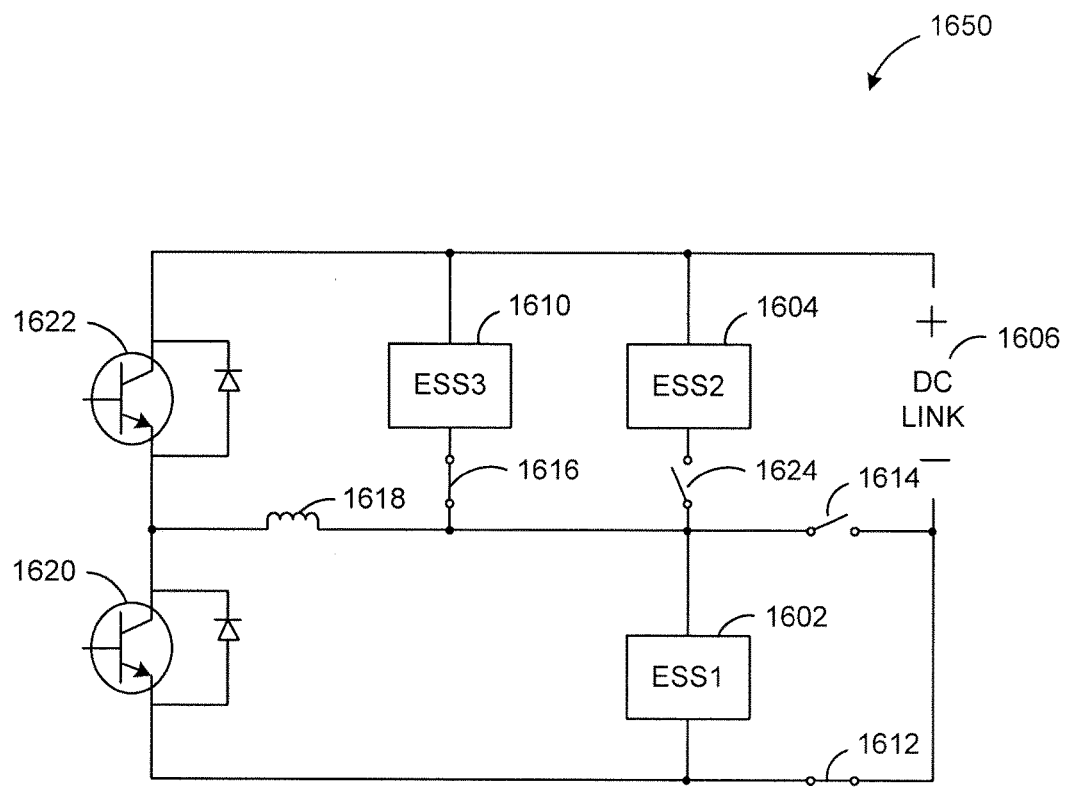
FIG. 16L illustrates the reconfigurable energy storage system of FIG. 16A with the first switch and the sixth switch closed, and the remaining switches open.

Reference is next made to FIG. 16L illustrating a reconfigurable energy storage system 1650, which is similar in structure to the reconfigurable energy storage system 1600 with the first switch 1612 and the sixth switch 1616 closed. The structure and function of the reconfigurable energy storage system 1650 is identical to that of the reconfigurable energy storage system 1642 of FIG. 16H with the exception of having the third energy storage system 1610 replace the second energy system 1604.

Figure 16M:
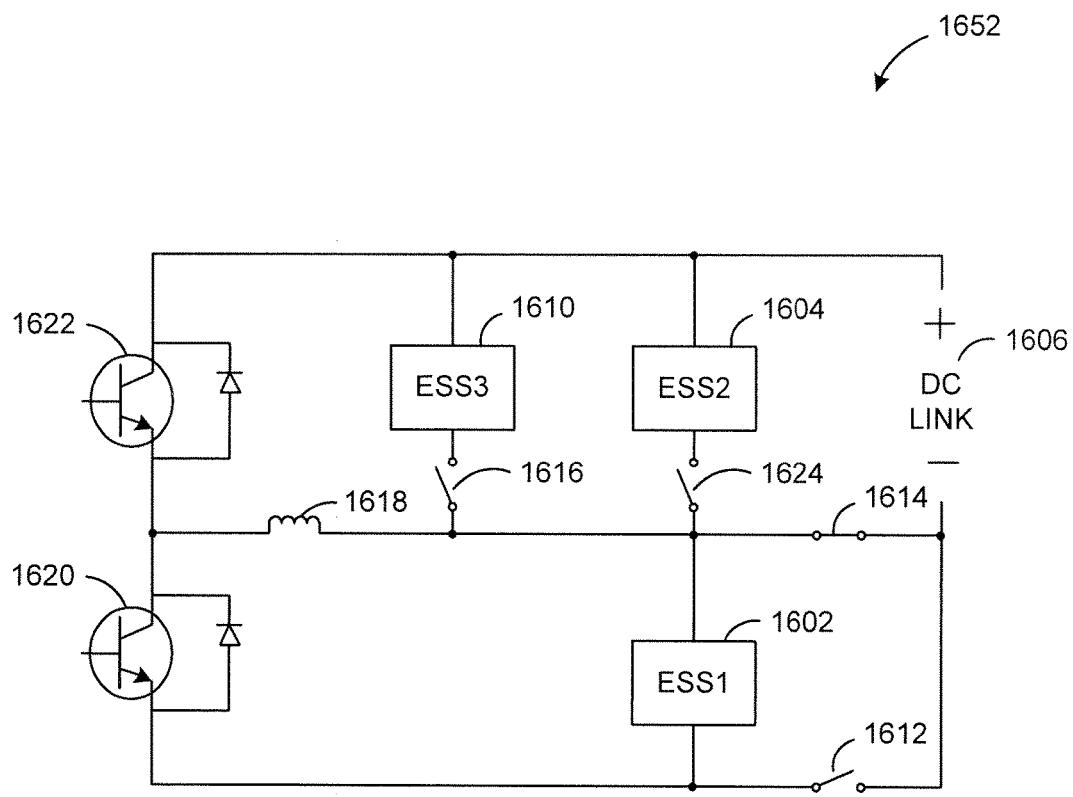
FIG. 16M illustrates the reconfigurable energy storage system of FIG. 16A with the second switch closed, and the fourth switch and the fifth switch active, and the first switch, the third switch and the sixth switch open.

Reference is next made to FIG. 16M illustrating a reconfigurable energy storage system 1652 according to an example embodiment. Reconfigurable energy storage system 1652 is similar in structure to the reconfigurable energy storage system 1600 with the second switch 1614 closed, and the fourth switch 1620 and the fifth switch 1622 active.

Accordingly, a closed circuit path is formed including the first energy storage system, the inductor 1618 and the DC link 1606. In this configuration, the energy transfer occurs between the first energy storage system 1602 and the inductor 1618, and between the inductor 1618 and the DC link 1606.

Figure 16N:
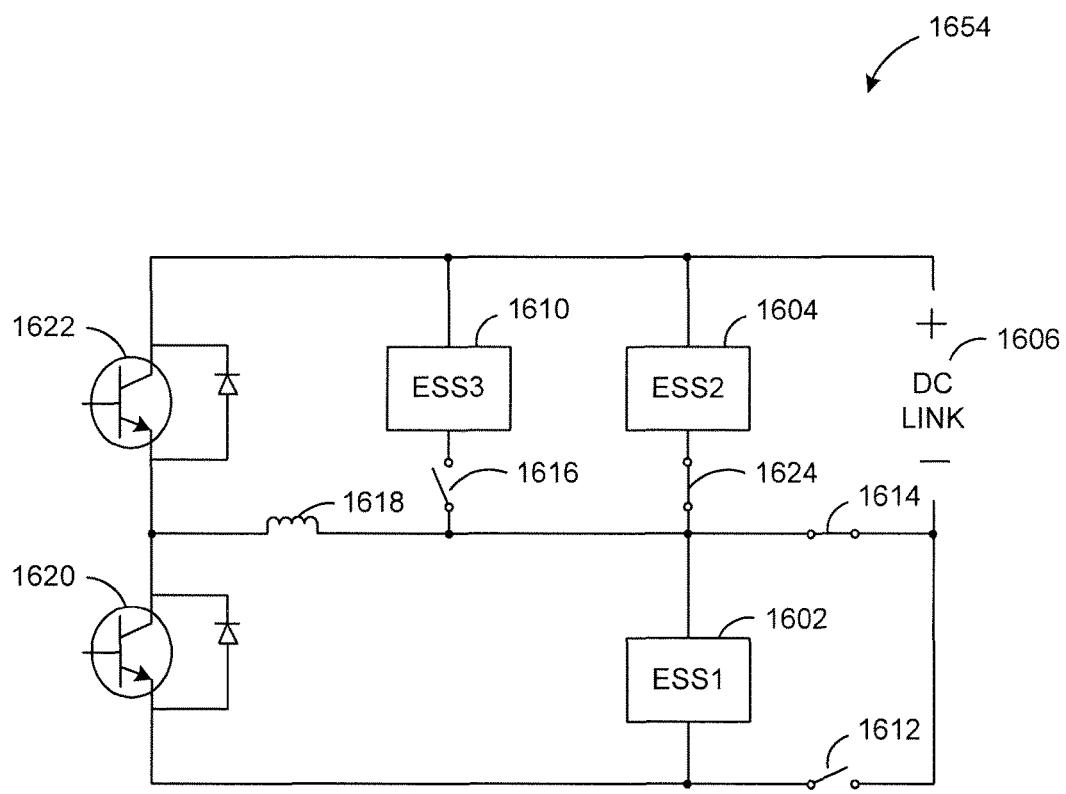
FIG. 16N illustrates the reconfigurable energy storage system of FIG. 16A with the second switch and the third switch closed, and the fourth switch and the fifth switch active, and the first switch and the sixth switch open.

Reference is next made to FIG. 16N illustrating a reconfigurable energy storage system 1654 according to an example embodiment. Reconfigurable energy storage system 1654 is similar in structure to the reconfigurable energy storage system 1600 with the second switch 1614 and the third switch 1624 closed, and the fourth switch 1620 and the fifth switch 1622 active. This configuration is similar in structure and operation to the reconfigurable energy storage system 550 of FIG. 5C. In this configuration, the energy transfer can occur between the first energy storage system 1602 and the parallel arrangement of the second energy storage system 1604 and the DC link 1606 via the fourth switch 1620, the fifth switch 1622 and the inductor 1618.

Figure 16O:
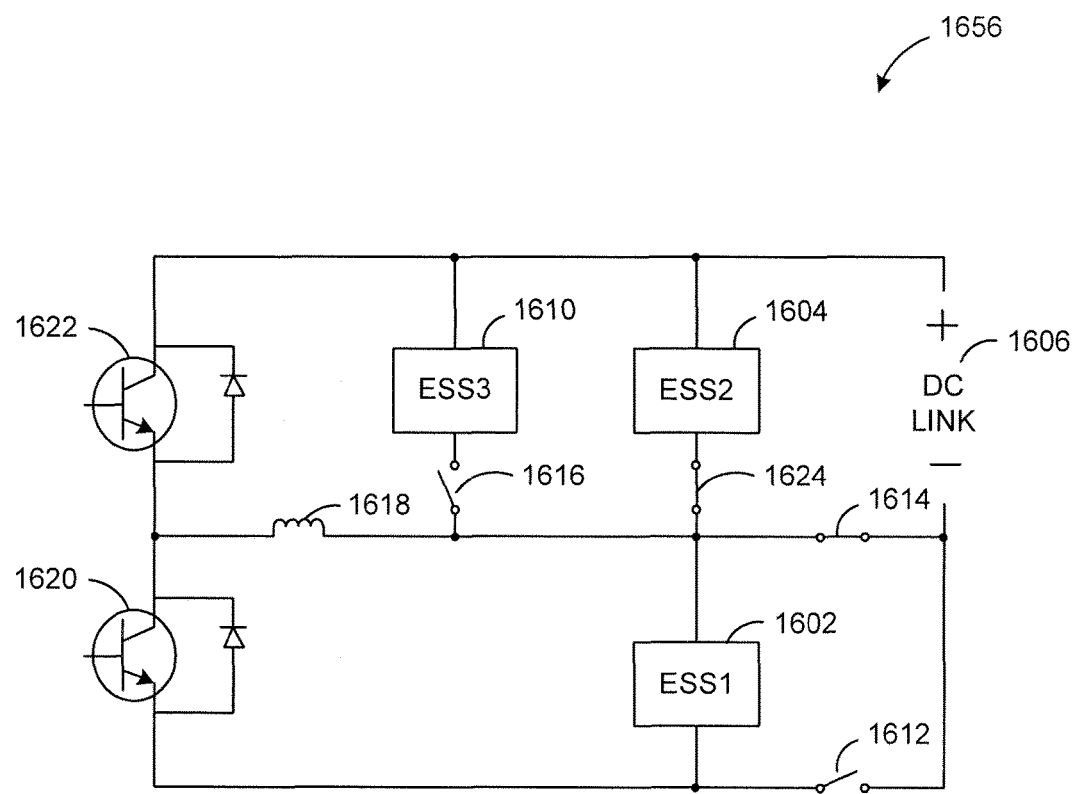
FIG. 16O illustrates the reconfigurable energy storage system of FIG. 16A with the second and the third switches closed, and the remaining switches open.

Reference is next made to FIG. 16O illustrating a reconfigurable energy storage system 1656 according to an example embodiment. Reconfigurable energy storage system 1656 is similar in structure to the reconfigurable energy storage system 1600 with the second switch 1614 and the third switch 1624 closed. In this configuration, the energy transfer can occur between the second energy storage system 1604 and the DC link 1606.

Figure 16P:
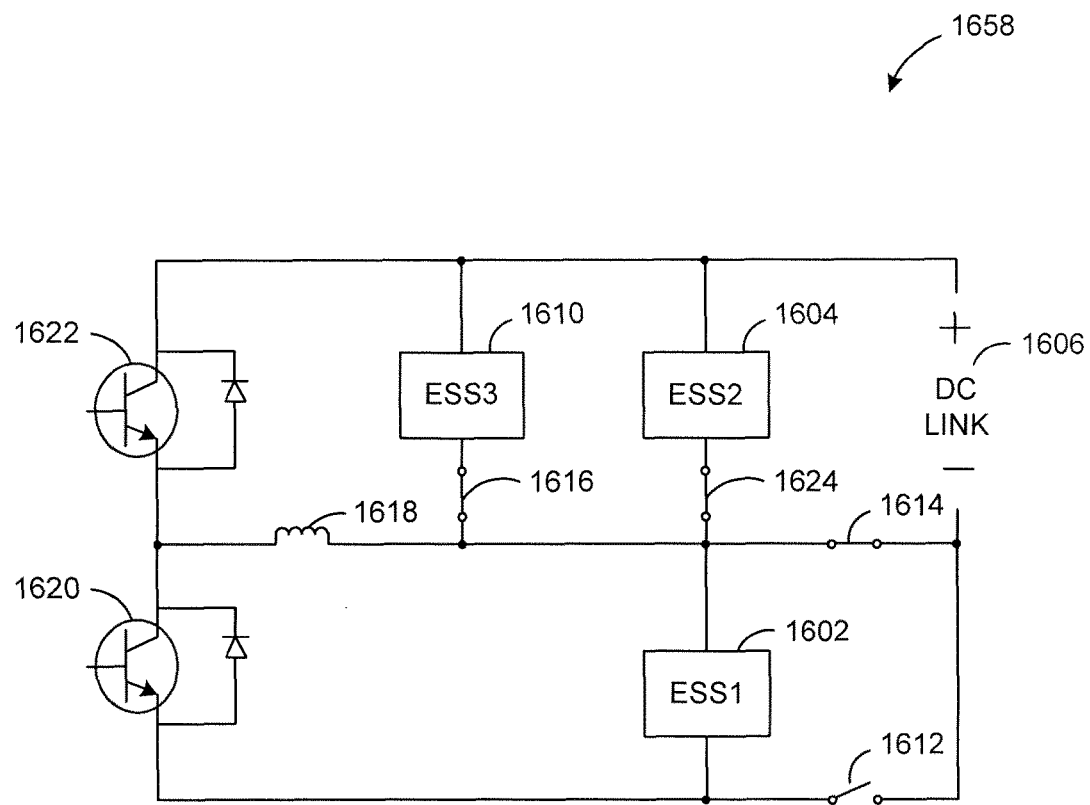
FIG. 16P illustrates the reconfigurable energy storage system of FIG. 16A with the second switch, the third switch and the sixth switch closed, and the fourth switch and the fifth switch active, and the first switch open.

Reference is next made to FIG. 16P illustrating a reconfigurable energy storage system 1658 according to an example embodiment. Reconfigurable energy storage system 1658 is similar in structure to the reconfigurable energy storage system 1600 with the second switch 1614, the third switch 1624, and the sixth switch 1616 closed, and the fourth switch 1620 and the fifth switch 1622 active.

This configuration is similar in structure and operation to the reconfigurable energy storage system 750 of FIG. 7C. In this configuration, the energy transfer can occur between the first energy storage system 1602 and the parallel arrangement of the second energy storage system 1604, the third energy storage system 1610 and the DC link 1606 via the fourth switch 1620, the fifth switch 1622 and the inductor 1618.

Figure 16Q:
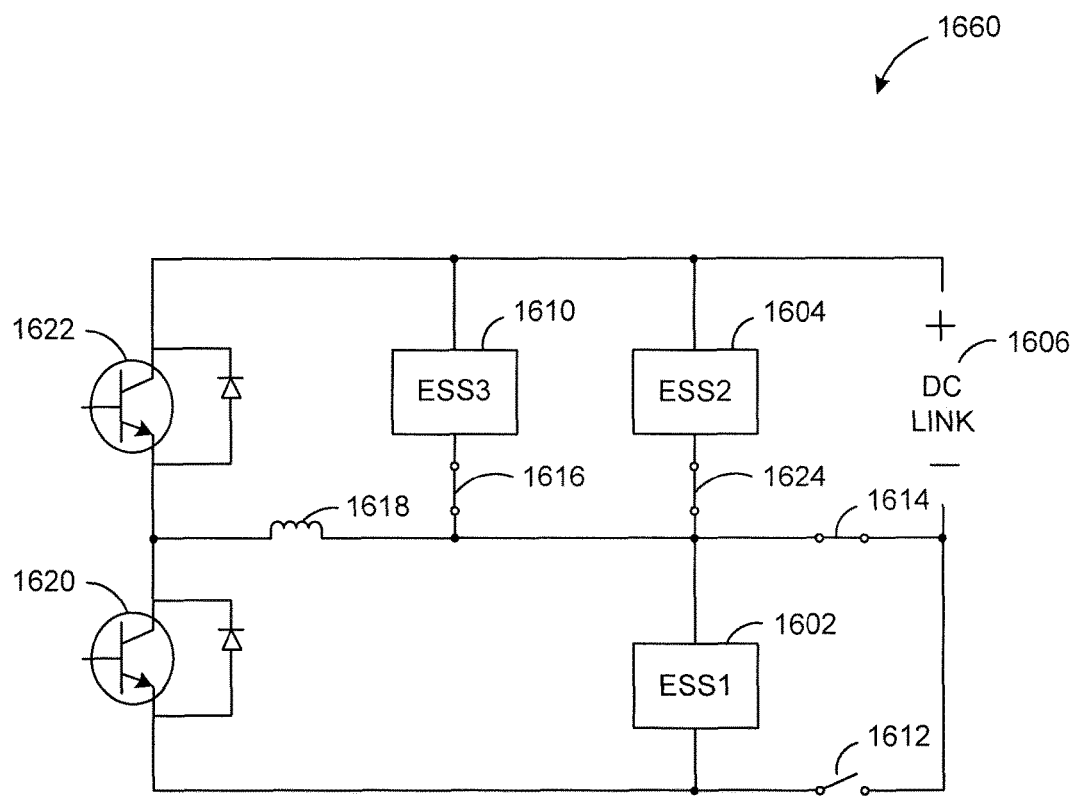
FIG. 16Q illustrates the reconfigurable energy storage system of FIG. 16A with the second switch, the third switch and the sixth switch closed, and the first switch, the fourth switch and the fifth switch open.

Reference is next made to FIG. 16Q illustrating a reconfigurable energy storage system 1660 according to an example embodiment. Reconfigurable energy storage system 1660 is similar in structure to the reconfigurable energy storage system 1600 with the second switch 1614, the third switch 1624 and the sixth switch 1616 closed. In this configuration, the energy transfer can occur between the DC link 1606 and the parallel arrangement between the second energy storage system 1604 and the third energy storage system 1610.

Figure 16R:
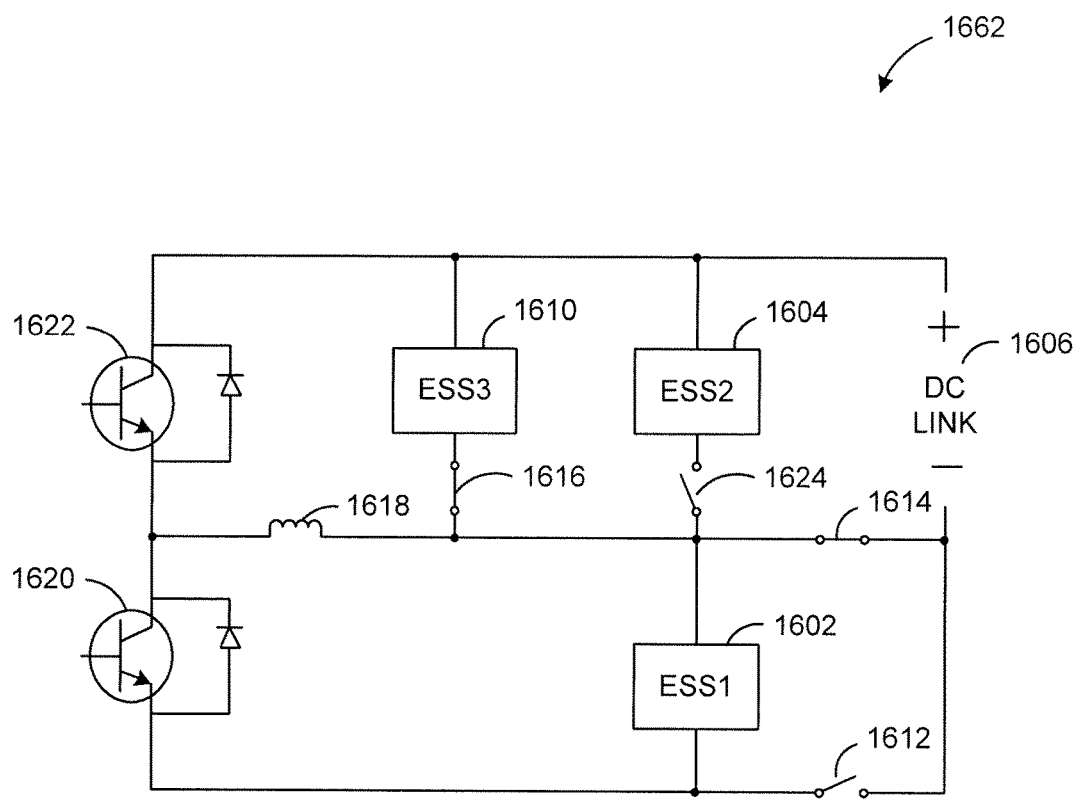
FIG. 16R illustrates the reconfigurable energy storage system of FIG. 16A with the second switch and the sixth switch closed, and the fourth switch and the fifth switch active, and the first switch and the third switch open.

Reference is next made to FIG. 16R illustrating a reconfigurable energy storage system 1662 according to an example embodiment. Reconfigurable energy storage system 1662 is similar in structure to the reconfigurable energy storage system 1600 with the second switch 1614 and the sixth switch 1616 closed, and the fourth switch 1620 and the fifth switch 1622 active.

This configuration is similar in structure and operation to the reconfigurable energy storage system 550 of FIG. 5C. In this configuration, the energy transfer occurs between the first energy storage system 1602 and the parallel arrangement of the second energy storage system 1604 and the DC link 1606 via the fourth switch 1620, the fifth switch 1622 and the inductor 1618. In this configuration, the energy transfer also occurs between the third energy storage system 1604 and the DC link 1606.

Figure 16S:
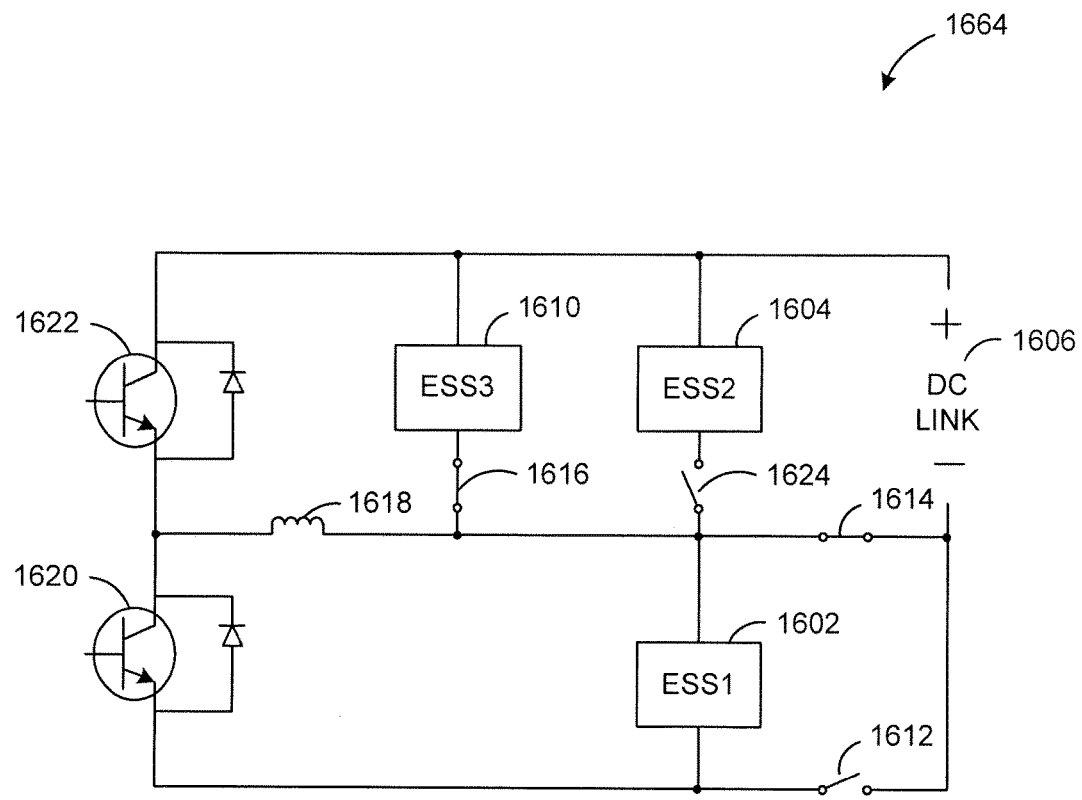
FIG. 16S illustrates the reconfigurable energy storage system of FIG. 16A with the second switch and the sixth switch closed, and the remaining switches open.

Reference is next made to FIG. 16S illustrating a reconfigurable energy storage system 1664 according to an example embodiment. Reconfigurable energy storage system 1664 is similar in structure to the reconfigurable energy storage system 1600 with the second switch 1614 and the sixth switch 1616 closed. In this configuration, the energy transfer occurs between the third energy storage system 1610 and the DC link 1606.

Figure 11A:
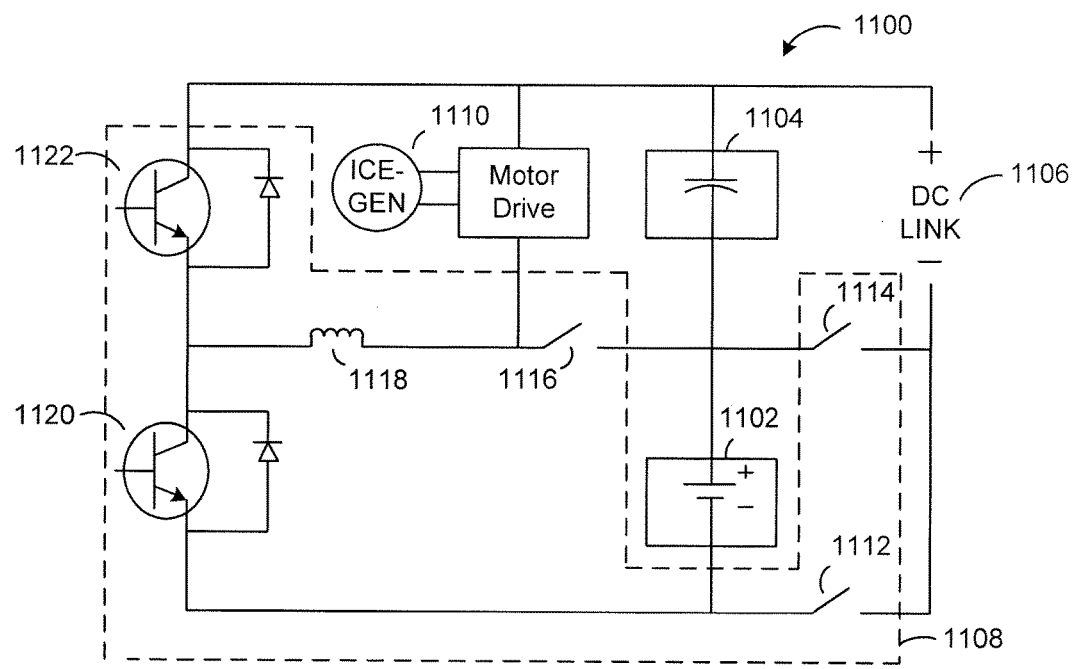
FIG. 11A illustrates a reconfigurable energy storage system according to another example embodiment.

Reference is next made to FIG. 11A illustrating a reconfigurable energy storage system 1100 according to an example embodiment. Reconfigurable energy storage system 1100 comprises a battery 1102, an ultracapacitor 1104, an ICE-GEN set 1110, a DC link 1106 and a power electronics converter 1108. Power electronic converter 1108 comprises a first switch 1112, a second switch 1114, a third switch 1116, a fourth switch 1120, a fifth switch 1122 and an inductor 1118.

First switch 1112 allows switching of the negative terminal of the DC link 1106 to the negative terminal of the battery 1102. Second switch 1114 allows switching of the negative terminal of the DC link 1106 to the negative terminal of the ultracapacitor 1104. Third switch 1116 allows connecting and disconnecting of the power electronics converter 1108 and the ICE-GEN set 1110 from the rest of the components of the reconfigurable energy storage system 1100.

Figure 11B:
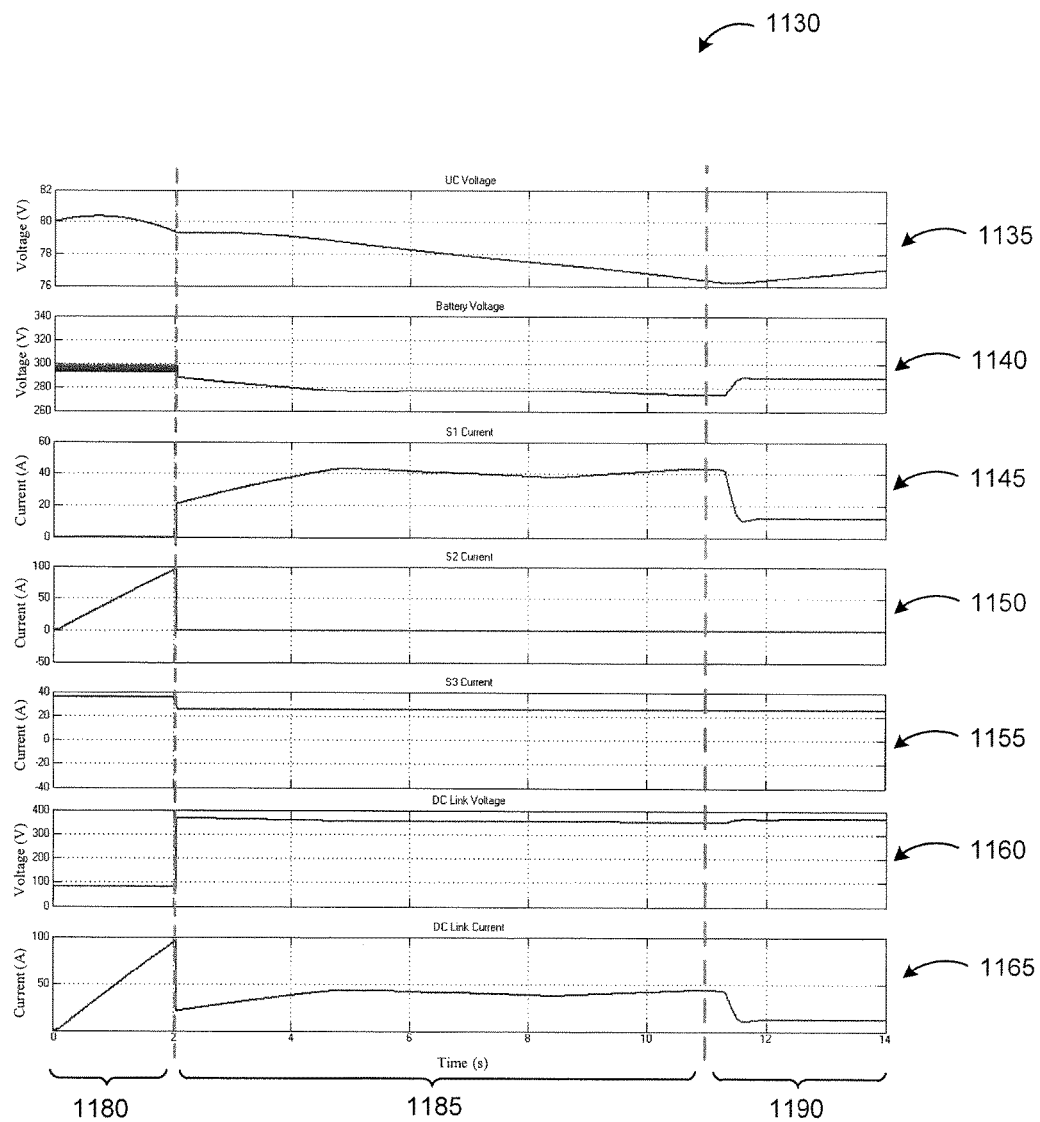
FIG. 11B illustrates voltage or current response of various components of the reconfigurable energy storage system of FIG. 11A.

Reference is next made to FIG. 11B illustrating the response 1130 of the various components of the reconfigurable energy storage system 1100 in application within a HEV or a PHEV vehicle. In particular, FIG. 11B illustrates a voltage and/or current response between various components of the reconfigurable energy storage system 1100 during a low speed acceleration stage 1180, a high speed acceleration stage 1185 and a constant high speed stage 1190 of the HEV or the PHEV vehicle.

Response 1135 illustrates a voltage response of the ultracapacitor 1104 in the three stages 1180, 1185 and 1190. In the example of FIG. 11A, the ultracapacitor 1104 is acting as the main source of power to the load. As illustrated by the response 1135, the voltage of the ultracapacitor 1104 in the low speed acceleration stage 1180 and in the high speed acceleration stage 1185 is decreasing since the ultracapacitor 1104 is providing power to the load. A slight increase in the voltage of the ultracapacitor 1104 in the low speed acceleration stage 1180 may be attributed to the ICE-GEN set 1110. The ICE-GEN set 1110 may charge the ultracapacitor 1104 directly. In the constant high speed stage 1190, the voltage of the ultracapcitor 1104 increases. In this stage, the ICE-GEN set 1110 charges the ultracapacitor 1104.

Response 1140 illustrates a voltage response of the battery 1102 in the three stages 1180, 1185 and 1190. The voltage of the battery 1102 remains constant in the low speed acceleration stage 1180. Since the ultracapacitor 1104 is the main source of power to the load, the battery 1102 may not contribute power when the load requires a low voltage, such as in stage 1180. In the high speed acceleration stage 1185, since the load requires a high voltage, the battery 1102 also contributes power to the load. Accordingly, the voltage level of the battery 1102 decreases in this stage. In the constant high speed stage 1190, the voltage of the battery 1102 increases. In this stage, the ICE-GEN set 1110 charges the battery 1102.

Response 1145 illustrates a current response of the first switch 1112. In the low speed acceleration stage 1180, the first switch 1112 remains open. Accordingly, no current is drawn by the first switch 1112 and the current level of the first switch 1112 stays at 0 A. In the high speed acceleration stage 1185, the first switch 1112 closes. Accordingly, the current draw of the first switch 1112 increases. In the constant high speed stage, the first switch 1112 remains closed and the current flow within the first switch 1112 decreases.

Response 1150 illustrates a current response of the second switch 1114. In the low speed acceleration stage 1180, the second switch 1114 closes. The change from an open position to a closed position increases the current draw of the second switch 1114 in stage 1180. In the high speed acceleration stage 1185, the second switch 1114 opens. The change in the position of the second switch 1114 from close to open causes the current to drop down to 0 A. The second switch 1114 remains closed in the constant high speed stage 1190 causing the current level to remain at 0 A.

Response 1155 illustrates a current response of the third switch 1116. The third switch 1116 remains closed in all of the three stages, i.e. the low speed acceleration stage 1180, the high speed acceleration stage 1185 and the constant high speed stage 1190. Accordingly, the current level of the third switch 1116 remains high.

Response 1160 illustrates a voltage response of the DC link 1106 in all three stages 1180, 1185 and 1190. In the low speed acceleration stage 1180, the DC link voltage remains constant around 100V since the load does not require a high voltage in this stage. In the high speed acceleration stage 1185 and the constant high speed stage 1190, the DC link voltage increases to satisfy the load requirements. In these stages, the voltage requirement of the load increases.

Response 1165 illustrates a current response of the DC link voltage in all three stages 1180, 1185 and 1190. In the low speed acceleration stage 1180, the DC link current increases from 0 A to about a 100 A to meet the load requirements. The DC link current decreases in the high speed acceleration stage 1185 and further decrease in the constant high speed stage 1190 to meet the load requirements. The current draw by the load is the highest during acceleration from a stand-still position or a slow speed. The current draw by the load during acceleration from a high speed or during a constant high speed of the vehicle is low.

Figure 12A:
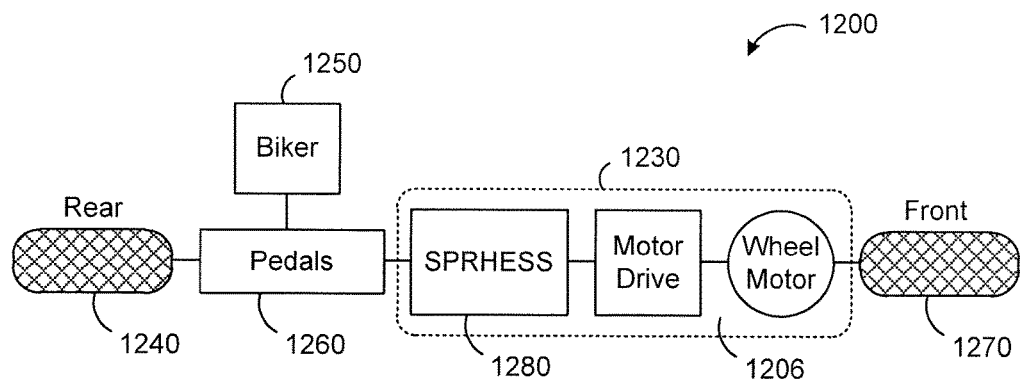
FIG. 12A illustrates a hybrid powertrain topology of a hybrid recumbent bicycle according to an example embodiment.

Reference is next made to FIG. 12A illustrating a hybrid powertrain topology of a hybrid recumbent bicycle 1200 according to an example embodiment. The hybrid powertrain topology comprises a rear end 1240, a front end 1270, pedals 1260, a seat for seating a biker 1250 and power module 1230.

Figure 12B:
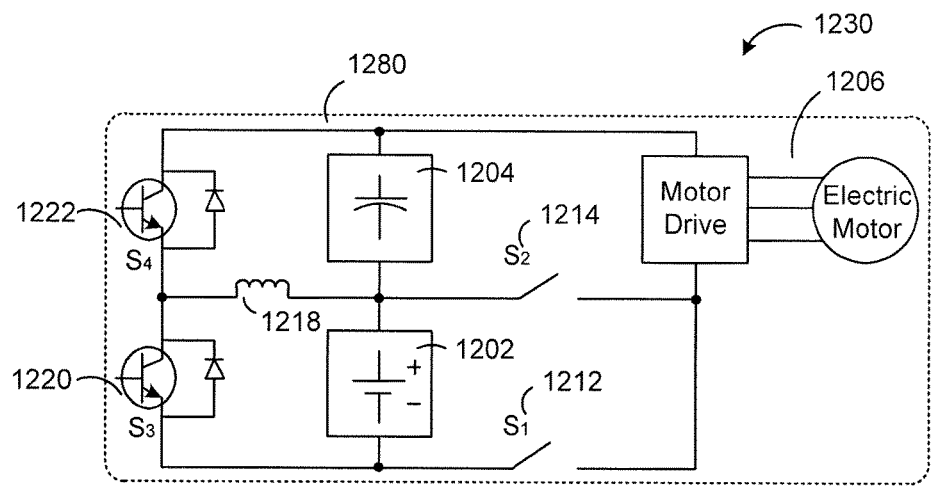
FIG. 12B illustrates a configuration of power module of FIG. 12A according to an example embodiment.

Reference is next made to FIG. 12B illustrating a configuration of the power module 1230 according to an example embodiment. Power module 1230 comprises a reconfigurable energy storage system 1280 and an electric load 1206. Reconfigurable energy storage system 1280 comprises a first energy storage system 1202, a second energy storage system 1204, a first switch 1212, a second switch 1214, a third switch 1220, a fourth switch 1222 and an inductor 1218.

In this example embodiment, the first energy storage system 1202 is a battery and the second energy storage system 1204 is an ultracapacitor. The configuration of power module 1230 as illustrated in FIG. 12B is similar in structure to the reconfigurable energy storage system 500 of FIG. 5A where the DC link 506 of FIG. 5A is replaced with electric load 1206. The operation of the power module 1230 is similar to the reconfigurable energy storage systems 530 of FIG. 5B, 550 of FIGS. 5C and 570 of FIG. 5D.

Figure 13A:
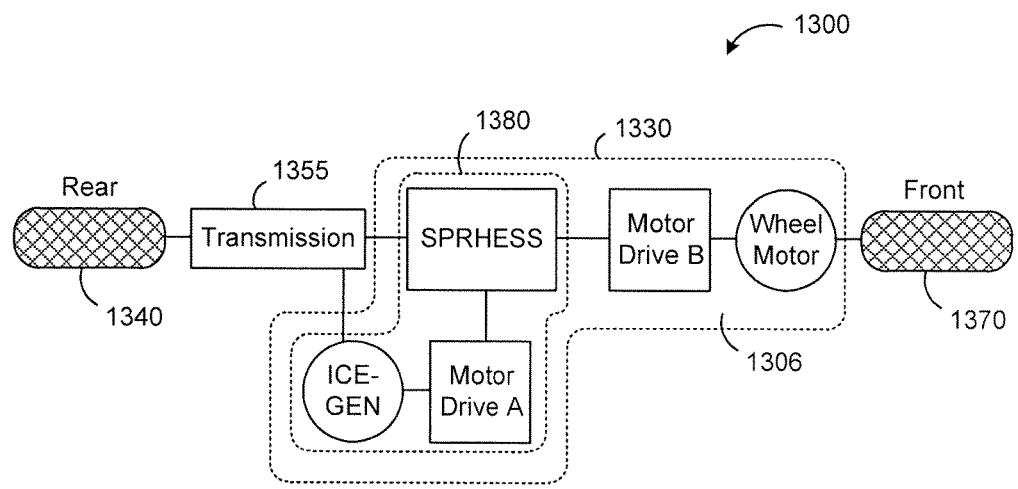
FIG. 13A illustrates a hybrid powertrain topology of a hybrid motorbike according to an example embodiment.

Reference is next made to FIG. 13A illustrating a hybrid powertrain topology of a hybrid motorbike 1300 according to an example embodiment. The hybrid powertrain topology comprises a rear end 1340, a front end 1370, transmission 1355 and power module 1330.

Figure 13B:
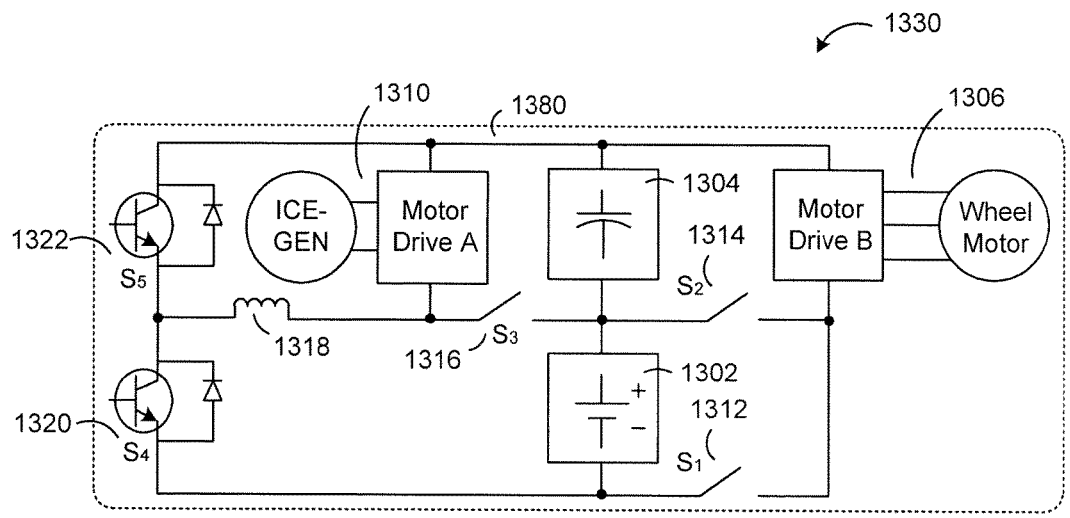
FIG. 13B illustrates a configuration of power module of FIG. 13A according to an example embodiment.

Reference is next made to FIG. 13B illustrating a configuration of the power module 1330 according to an example embodiment. Power module 1330 comprises a reconfigurable energy storage system 1380 and an electric load 1306. Reconfigurable energy storage system 1380 comprises a first energy storage system 1302, a second energy storage system 1304, a third energy storage system 1310, a first switch 1312, a second switch 1314, a third switch 1316, a fourth switch 1320, a fifth switch 1322 and an inductor 1318.

In this example embodiment, the first energy storage system 1302 is a battery, the second energy storage system 1304 is an ultracapacitor and the third energy storage system 1310 is an internal combustion engine-generation set. The configuration of power module 1330 as illustrated in FIG. 13B is similar in structure to the reconfigurable energy storage system 700 of FIG. 7A where the DC link 706 of FIG. 7A is replaced with electric load 1306. The operation of the power module 1330 is similar to the reconfigurable energy storage systems 730 of FIG. 7B, 750 of FIGS. 7C and 770 of FIG. 7D.

Figure 14A:
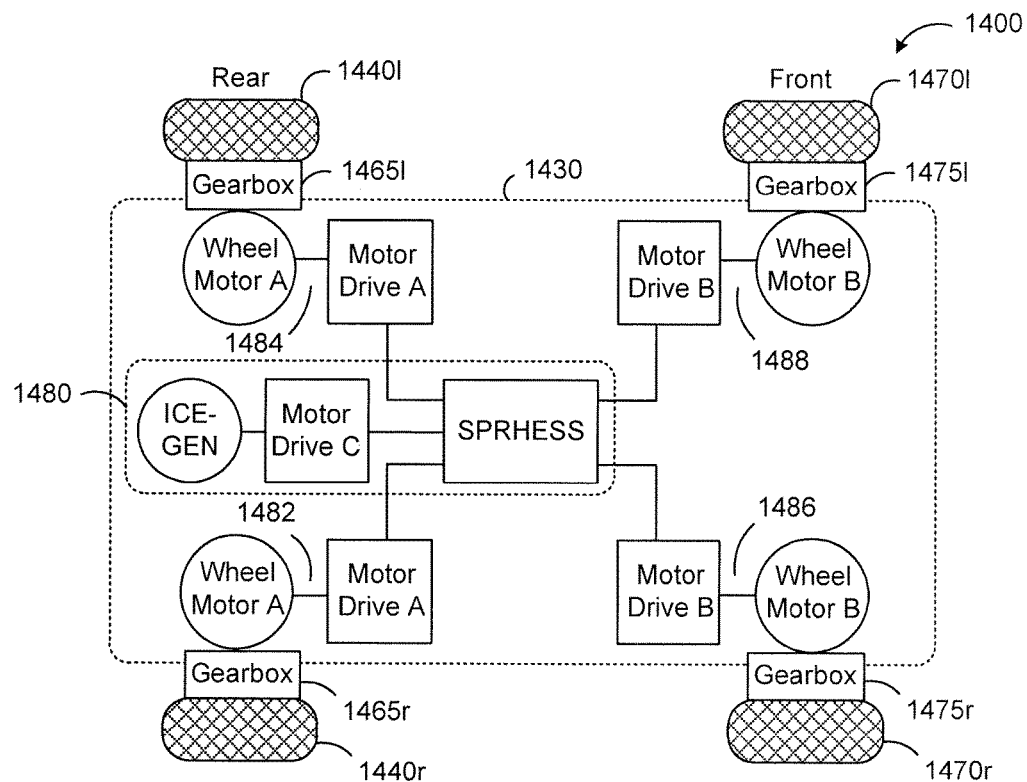
FIG. 14A illustrates a hybrid powertrain topology of a hybrid car according to an example embodiment.

Reference is next made to FIG. 14A illustrating a hybrid powertrain topology of a hybrid car 1400 according to an example embodiment. The hybrid powertrain topology comprises a rear left end 1440*l*, a rear right end 1440*r*, a front left end 1470*l*, a front right end 1470*r*, a gearbox for rear left end 1465*l*, a gearbox for rear right end 1465*r*, a gearbox for front left end 1475*l*, a gearbox for front right end 1475*r* and power module 1430. Power module 1430 comprises a reconfigurable energy storage system 1480, and electric loads for rear left side load 1484, rear right side load 1482, front left side load 1488 and front right side load 1486.

Figure 14B:
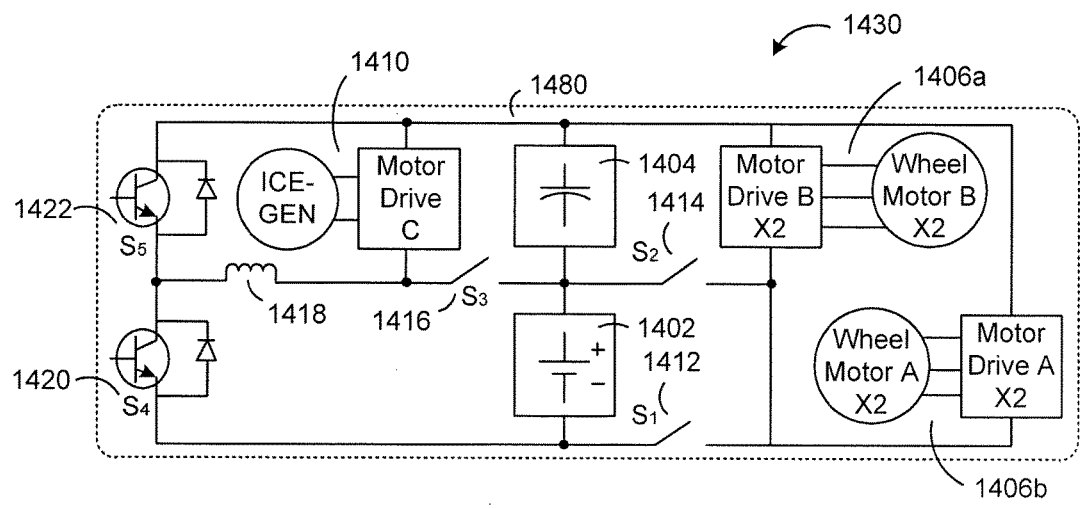
FIG. 14B illustrates a configuration of power module of FIG. 14A according to an example embodiment.

Reference is next made to FIG. 14B illustrating a configuration of the reconfigurable energy storage system 1480 according to an example embodiment. Reconfigurable energy storage system 1480 comprises a first energy storage system 1402, a second energy storage system 1404, a third energy storage system 1410, a first switch 1412, a second switch 1414, a third switch 1416, a fourth switch 1420, a fifth switch 1422 and an inductor 1418.

In this example embodiment, the reconfigurable energy storage system 1480 is coupled to a front side load 1406*a* and a rear side load 1406*b*. The rear side load 1406*b* may comprise the rear left side load 1484 and the rear right side load 1482. The front side load 1406*a* may comprise the front left side load 1488 and the front right side load 1486.

The configuration of power module 1430 as illustrated in FIG. 14B is similar in structure to the reconfigurable energy storage system 700 of FIG. 7A where the DC link 706 of FIG. 7A is replaced with the rear side load 1406*b* and the front side load 1406*a*. The operation of the power module 1430 is similar to the reconfigurable energy storage systems 730 of FIG. 7B, 750 of FIGS. 7C and 770 of FIG. 7D.

Embodiments of the present invention have been described herein by way of example only. Various additional modifications and variations to these exemplary embodiments may be apparent without departing from the scope of the invention, which is limited only by the appended claims.

The invention claimed is:

1. A method for reconfiguring a reconfigurable energy storage system, the method comprising:

determining a first power level corresponding to a state of charge of a first energy storage system for storing electrical energy;

determining a second power level corresponding to a state of charge of a second energy storage system for storing electrical energy;

determining a load coupled to the first energy storage system and the second energy storage system;

providing a power converter coupled to the load, the first energy storage system and the second energy storage system, the power converter comprising at least two bidirectional switches, including a first bidirectional switch and a second bidirectional switch, wherein the first bidirectional switch is coupled to a positive terminal of the first or the second energy storage system, and the second bidirectional switch is coupled to a negative terminal of the same energy storage system, the first bidirectional switch and the second bidirectional switch having a common connection, and neither the first bidirectional switch nor the second bidirectional switch being configured to couple the first energy storage system to the second energy storage system; and manipulating the power transfer between the first energy storage system and the second energy storage system such that one of the first and the second energy storage systems is configured to transfer power to the other of the first and the second energy storage systems by operating the power converter to configure the first energy storage system to be in one of a series and parallel connection with the second energy storage system based on at least one of the first power level relative to a first threshold, the second power level relative to a second threshold and an electrical requirement of the load, wherein the second energy storage system is different than the first energy storage system.

2. The method of claim 1, wherein if the second power level is less than the second threshold, the first power level is equal to or higher than the first threshold and the load is zero, the method comprises manipulating the first energy storage system to charge the second energy storage system.

3. The method of claim 1, wherein if the first power level is lower than the first threshold, the second power level is equal to or higher than the second threshold and the load is zero, the method comprises manipulating the second energy storage system to charge the first energy storage system.

4. The method of claim 1, wherein if the load requires a high current, the method comprises manipulating the power transfer between the first energy storage system and the second energy storage system by configuring the first energy storage system in parallel with the second energy storage system.

5. The method of claim 1, wherein if the load requires a voltage higher than each of the first energy storage system and the second energy storage system, the method comprises manipulating the power transfer between the first energy storage system and the second energy storage system by configuring the first energy storage system in series with the second energy storage system.

6. The method of claim 1, wherein if the load supplies a voltage higher than each of the first energy storage system and the second energy storage system, the method comprises manipulating the power transfer between the first energy storage system and the second energy storage system by configuring the first energy storage system in series with the second energy storage system.

7. The method of claim 1, wherein if the load supplies a voltage within an allowable voltage range of the each of the first energy storage system and the second energy storage system, the method comprises manipulating the power transfer between the first energy storage system and the second energy storage system by configuring the first energy storage system in parallel with the second energy storage system.

8. The method of claim 1, wherein the reconfigurable energy storage system further comprises a third energy storage system for providing electrical energy, the method further comprising:

determining a third power level corresponding to the third energy storage system; and manipulating the power transfer between the first energy storage system, the second energy storage system and the third energy storage system based on the third power level.

9. The method of claim 8, wherein the third power level corresponds to a state of charge of the third energy storage system.

10. The method of claim 8, wherein the third energy storage system generates electrical energy and wherein the third power level corresponds to an amount of electrical energy generated by the third energy storage element.

11. The method of claim 8, wherein manipulating the power transfer between the first energy storage system, the second energy storage system and the third energy storage system comprises charging at least one of the first energy storage system and the second energy storage system by the third energy storage system.

12. The method of claim 1, wherein manipulating the power transfer between the first energy storage system and the second energy storage system comprises manipulating the at least one bidirectional switch to connect or disconnect at least one of the first energy storage system and the second energy storage system.

13. A reconfigurable energy storage system comprising:

a first energy storage system for storing electrical energy;

a second energy storage system for storing electrical energy, wherein the second energy storage system is different than the first energy storage system; and a power converter coupled to the first energy storage system, the second energy storage system, the power converter comprising at least two bidirectional switches, including a first bidirectional switch and a second bidirectional switch, wherein the first bidirectional switch is coupled to a positive terminal of the first or the second energy storage system, and the second bidirectional switch is coupled to a negative terminal of the same energy storage system, the first bidirectional switch and the second bidirectional switch having a common connection, and neither the first bidirectional switch nor the second bidirectional switch being configured to couple the first energy storage system to the second energy storage system, and wherein the power converter is configured to determine a first power level corresponding to a state of charge of the first energy storage system, a second power level corresponding to a state of charge of the second energy storage system, and a load coupled to the power converter, and further configured to manipulate power transfer between the first energy storage system and the second energy storage system such that one of the first and the second energy storage systems is configured to transfer power to the other of the first and the second energy storage systems by configuring the first energy storage system to be in one of a series and parallel connection with the second energy storage system based on at least one of the first power level relative to a first threshold, the second power level relative to a second threshold and an electrical requirement of the load.

14. The system of claim 13, wherein the first energy storage system has an energy density that is higher than a corresponding energy density of the second energy storage system.

15. The system of claim 13, wherein the second energy storage system has a power density that is higher than a corresponding power density of the first energy storage system.

16. The system of claim 13, wherein the first energy storage system is a lithium ion battery.

17. The system of claim 13, wherein the second energy storage system is an ultracapacitor.

18. The system of claim 13, further comprising a third energy storage system for providing electrical energy, wherein the power converter is further configured to determine a third power level corresponding to the third energy storage system, and manipulate the power transfer between the first energy storage system, the second energy storage system and the third energy storage system based further on the third power level.

19. The system of claim 18, wherein the third energy storage system provides an energy density higher than the power density.

20. The system of claim 18, wherein the third energy storage system generates electrical energy and wherein the power converter is further configured to determine an amount of electrical energy generated by the third energy storage system as the third power level.

* * * * *